United States Patent
Inoue et al.

(10) Patent No.: US 11,025,119 B2
(45) Date of Patent: Jun. 1, 2021

(54) ROTARY ELECTRIC MACHINE

(71) Applicant: HONDA MOTOR CO., LTD., Tokyo (JP)

(72) Inventors: Masashi Inoue, Wako (JP); Tadashi Yamaguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 73 days.

(21) Appl. No.: 16/286,712

(22) Filed: Feb. 27, 2019

(65) Prior Publication Data

US 2019/0280549 A1 Sep. 12, 2019

(30) Foreign Application Priority Data

Mar. 7, 2018 (JP) .............................. JP2018-040765

(51) Int. Cl.
*H02K 3/34* (2006.01)
*H02K 3/32* (2006.01)
(Continued)

(52) U.S. Cl.
CPC ............... *H02K 3/345* (2013.01); *H02K 1/16* (2013.01); *H02K 3/12* (2013.01); *H02K 3/48* (2013.01); *H02K 5/24* (2013.01); *H02K 9/19* (2013.01); *H02K 21/14* (2013.01); *H02K 1/2766* (2013.01); *H02K 9/22* (2013.01)

(58) Field of Classification Search
CPC ............ H02K 3/345; H02K 3/34; H02K 1/16; H02K 3/12; H02K 3/48; H02K 5/24; H02K 9/19; H02K 15/085; H02K 15/10; H02K 3/40; H02K 15/12; H02K 15/105
See application file for complete search history.

(56) References Cited

U.S. PATENT DOCUMENTS 5,998,903 A * 12/1999 Umeda ..................... H02K 3/28
310/179
6,339,870 B1 * 1/2002 Maruyama ............. H02K 3/325
29/596

(Continued)

FOREIGN PATENT DOCUMENTS

| CN | 1627603 | 6/2005 |
|---|---|---|
| CN | 1973419 | 5/2007 |

(Continued)

OTHER PUBLICATIONS

English machine translation, Fukami, JP 2017127063 (Year: 2017).*

(Continued)

*Primary Examiner* — Burton S Mullins
(74) *Attorney, Agent, or Firm* — Amin, Turocy & Watson, LLP

(57) ABSTRACT

A rotary electric machine includes a stator. A plurality of slots are formed in a stator core of the stator, and a coil and an insulating sheet layer are inserted into the slots. A first coil side surface and a second coil side surface of the coil inserted into the slots serve as adhesive regions, which are adhered to a slot inner circumferential surface via the insulating sheet layer. In addition, a first coil end surface and a second coil end surface of the coil inserted into the slots serve as non-adhesive regions, which are maintained in a non-contact manner with respect to the slot inner circumferential surface.

4 Claims, 17 Drawing Sheets

(51) Int. Cl.
*H02K 1/16* (2006.01)
*H02K 21/14* (2006.01)
*H02K 5/24* (2006.01)
*H02K 9/19* (2006.01)
*H02K 3/12* (2006.01)
*H02K 3/48* (2006.01)
*H02K 9/22* (2006.01)
*H02K 1/27* (2006.01)

(56) References Cited

U.S. PATENT DOCUMENTS

| | | | | |
|---|---|---|---|---|
| 8,212,449 | B2 * | 7/2012 | Kouda | H02K 3/345 |
| | | | | 310/215 |
| 9,537,364 | B2 * | 1/2017 | Ishida | H02K 15/10 |
| 2005/0127774 | A1 * | 6/2005 | Sogabe | H02K 3/345 |
| | | | | 310/215 |
| 2019/0109506 | A1 * | 4/2019 | Yamaguchi | H02K 3/345 |
| 2019/0149005 | A1 * | 5/2019 | Yamaguchi | H02K 3/28 |
| | | | | 310/208 |

FOREIGN PATENT DOCUMENTS

| | | | | |
|---|---|---|---|---|
| CN | 101102062 | | 1/2008 | |
| CN | 104081633 | | 10/2014 | |
| CN | 104812580 | | 7/2015 | |
| CN | 107959363 | | 4/2018 | |
| CN | 108713231 | | 10/2018 | |
| JP | 2002-315249 | | 10/2002 | |
| JP | 2010-158121 | | 7/2010 | |
| JP | 2011-244596 | | 12/2011 | |
| JP | 2012-175822 | | 9/2012 | |
| JP | 2013009499 | A * | 1/2013 | ............... H02K 3/34 |
| JP | 5497532 | | 5/2014 | |
| JP | 2016-052226 | | 4/2016 | |
| JP | 2017127063 | * | 7/2017 | ............... H02K 3/34 |

OTHER PUBLICATIONS

English machine translation, Uchida et al. JP 2013009499A. (Year: 2013).*

Chinese Office Action for Chinese Patent Application No, 201910154613.3 dated Aug. 27, 2020.

* cited by examiner

ROTARY ELECTRIC MACHINE

CROSS-REFERENCE TO RELATED APPLICATION

Priority is claimed on Japanese Patent Application No. 2018-040765, filed Mar. 7, 2018, the content of which is incorporated herein by reference.

BACKGROUND OF THE INVENTION

Field of the Invention

The present invention relates to a rotary electric machine.

Description of Related Art

Among stators for rotary electric machines, a stator in which a coil is inserted into a slot of a stator core and a foamed resin sheet is sandwiched between an inner surface of the slot and the coil is known. The coil is fixed to the inner surface of the slot (i.e., the stator core) via the foamed resin sheet (for example, see Japanese Patent No. 5497532).

Specifically, in a state in which the foamed resin sheet is sandwiched between the inner surface of the slot and the coil, the foamed resin sheet is heated. A foamed resin is provided on both surfaces of the foamed resin sheet. When the foamed resin sheet is heated, the foamed resin is expanded and applied (adhered) to the entire inner surface of the slot and the entire area of the coil inserted into the slot.

Accordingly, the coil is fixed to the stator core via the foamed resin sheet.

In addition, among stators for rotary electric machines, a stator in which a coil is adhered to only an end portion of an inner surface of a slot in an axial direction of a stator is known (for example, see Japanese Unexamined Patent Application, First Publication No. 2016-52226).

SUMMARY OF THE INVENTION

However, in the stator disclosed in Japanese Patent No. 5497532, the foamed resin is adhered to the entire inner surface of the slot and the entire region of the coil (specifically, the entire area of the coil inserted into the slot). For this reason, rigidity of the rotary electric machine is excessively increased, and thus it is considered difficult to appropriately secure noise vibration (NV) characteristics.

In addition, in the stator disclosed in Japanese Unexamined Patent Application, First Publication No. 2016-52226, the coil is adhered to only the end portion of the inner surface of the slot. Accordingly, in comparison with the case in which the coil is adhered to the entire inner surface of the slot, it is difficult to transfer heat generated from the coil to the stator core. That is, it is considered that heat transfer characteristics between the stator core and the coil cannot be appropriately maintained. For this reason, it is necessary to devise a way to suitably secure a temperature of the coil in, for example, a water cooling structure that cools an outer circumferential section of the stator.

The present invention provides a rotary electric machine capable of appropriately securing cooling characteristics of a coil while appropriately securing NV characteristics.

(1) A rotary electric machine according to an aspect of the present invention includes a stator having a stator core with a plurality of slots, into which a coil and an insulating sheet are inserted, wherein at least one side surface of the coil, which is inserted into the slots, extending along a radial direction of the stator core is made as an adhesive region which is adhered to an inner surface of the slots via the insulating sheet, and an end surface of the coil, which is inserted into the slots, perpendicular to a radial direction of the stator core is made as a non-adhesive region which is maintained in a non-contact manner with respect to the inner surface of the slots.

According to the aspect of (1), at least one side surface of the coil is adhered to the inner surface of the slot as the adhesive region. In addition, the end surface of the coil serving as a non-adhesive region is maintained on the inner surface of the slot as a non-adhesion state.

In this way, the end surface of the coil is maintained in a non-adhesion state on the inner surface of the slot. Accordingly, it is possible to prevent the coil from being adhered to the stator core too strongly. Accordingly, it is possible to suppress rigidity of the rotary electric machine from excessively increasing, and noise vibration (NV) characteristics can be appropriately secured.

In addition, at least one side surface of the coil is adhered to the inner surface of the slot. Accordingly, heat transfer characteristics from the coil to the stator core can be appropriately secured. That is, heat generated by the coil is appropriately transferred from the side surface of the coil to the stator core via the insulating sheet.

Accordingly, for example, in a state in which the outer circumferential section of the stator is cooled by the water cooling structure, heat generated by the coil can be appropriately transferred to the stator core. In this way, since heat transferred to the stator core is appropriately cooled by the water cooling structure, cooling characteristics of the coil can be appropriately secured. Accordingly, a temperature of the coil can be appropriately secured.

(2) In the aspect of (1), among an inner area of the coil in the radial direction of the slots, both side surfaces of the coil extending along the radial direction of the stator core may be made as adhesive regions which adhere to the inner surface of the slots via the insulating sheet, and among an outer area of the coil in the radial direction of the slots, a side surface of the coil extending along the radial direction of the stator core may be made as a non-adhesive region which is maintained in a non-contact manner with respect to the inner surface of the slots.

Here, in the rotary electric machine, it is conceivable that coil eddy current loss on an air gap side of the rotary electric machine is increased in a high-revolution and high-torque zone, and generation of heat by the coil may be increased.

In the aspect of (2), among an inner area of the coil in the radial direction of the slots, both side surfaces of the coil are made as adhesive regions, and the adhesive regions are made to adhere to the inner surface of the slot. Accordingly, heat generated by the coil can be efficiently transferred to the inner surface of the slot (i.e., the stator core) via the adhesive region. Accordingly, heat transfer characteristics from the coil to the stator core can be improved on the side of the air gap.

Meanwhile, among an outer area of the coil in the radial direction of the slots, one side surface of the coil is made as a non-adhesive region, and the non-adhesive region is maintained in a non-contact manner with respect to the inner surface of the slot. Accordingly, heat transfer characteristics from the coil to the stator core can be appropriately suppressed on the side of the back yoke.

In this way, heat transfer characteristics can be improved at the air gap side at which generation of heat by the coil is increased, and heat transfer characteristics can be appropriately suppressed in the other area on the side of the back yoke. Accordingly, a temperature of the coil can be uniformized. Accordingly, heat transfer characteristics on the air gap side at which generation of heat by the coil is high can be improved, and the coil can be effectively cooled.

(3) In the aspect of (1) or (2), a sheet outer side surface of the insulating sheet facing the inner surface of the slot may be made as an adhesive region which adheres to the inner surface of the slot, and a part of a sheet inner side surface of the insulating sheet facing the coil may be made as a non-adhesive region which is maintained in a non-adhesion state with respect to the coil.

Here, for example, when the rotary electric machine includes a sufficient cooling capacity, heat transfer characteristics from the coil to the stator core can be suppressed to a relatively low level. Here, in the aspect of (3), at least a part of the sheet inner side surface of the insulating sheet serves as a non-adhesive region, and at least a part of the sheet inner side surface of the insulating sheet is held with respect to the coil in a non-contact manner.

In this way, since at least a part of the sheet inner side surface is held with respect to the coil in a non-contact manner, it is possible to prevent the coil from being adhered to the stator core too strongly. Accordingly, it is possible to suppress rigidity of the rotary electric machine from excessively increasing, and NV characteristics can be more appropriately secured.

According to the aspect of the present invention, at least one side surface of the coil is adhered to the inner surface of the slot as an adhesive region. In addition, the end surface of the coil serving as a non-adhesive region is held on the inner surface of the slot in a non-adhesion state. Accordingly, NV characteristics can be appropriately secured, and cooling characteristics of the coil can be appropriately secured.

DETAILED DESCRIPTION OF THE INVENTION

Hereinafter, embodiments of the present invention will be described with reference to the accompanying drawings. Further, in the embodiment, as a rotary electric machine 1, a motor employed in a driving unit for a vehicle such as a hybrid automobile or an electric automobile will be described. However, a configuration of the present invention is not limited to the motor employed in the driving unit for a vehicle and may be applied to a motor for power generation or a motor for another use, or a rotary electric machine (including a generator) for something other than a vehicle.

First Embodiment

Figure 1:
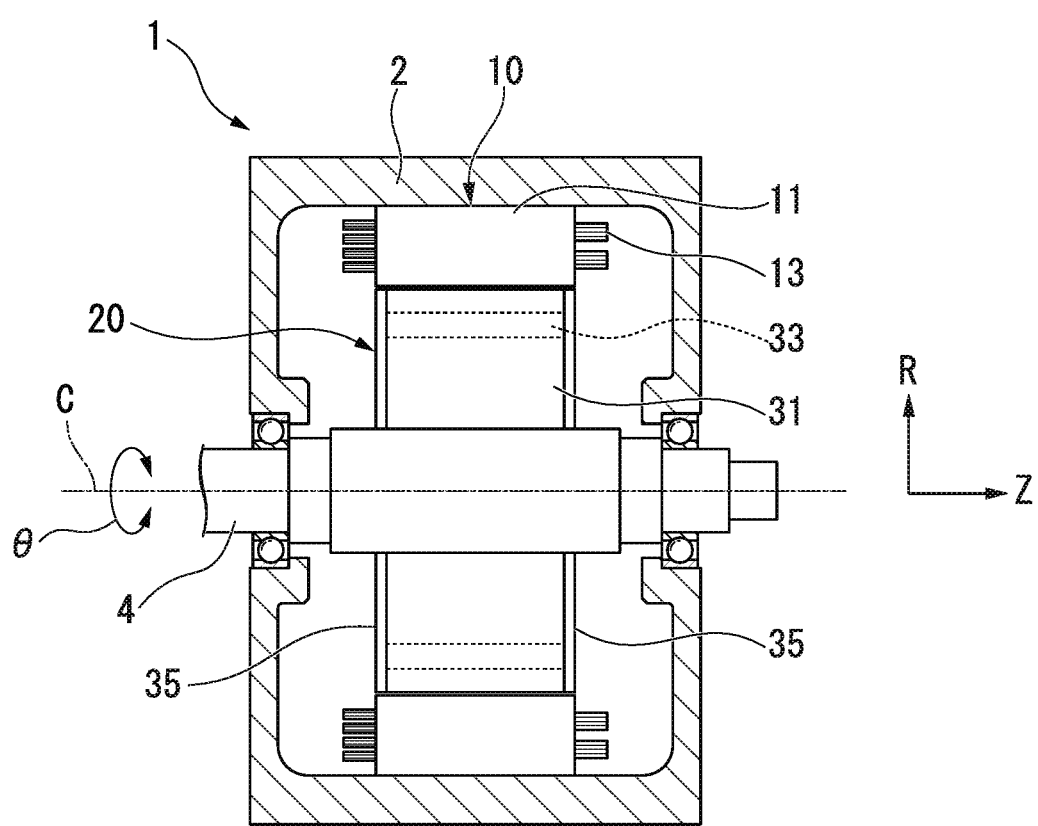
FIG. 1 is a cross-sectional view showing a schematic configuration of a rotary electric machine according to a first embodiment of the present invention.

As shown in FIG. 1, the rotary electric machine 1 is a traveling motor mounted in a vehicle such as a hybrid automobile or an electric automobile. The rotary electric machine 1 includes a housing 2, a stator 10, a rotor 20 and a shaft 4. The housing 2 rotatably supports the shaft 4 while accommodating the stator 10 and the rotor 20. Further, the stator 10, the rotor 20 and the shaft 4 are disposed using axes C thereof as a common axis.

Hereinafter, a direction extending along the axis C is referred to as an axial direction, a direction perpendicular to the axis C is referred to as a radial direction and a direction around the axis C is referred to as a circumferential direction. In addition, in the drawings, an arrow Z is referred to as the axial direction, an arrow R is referred to as the radial direction and an arrow θ is referred to as the circumferential direction.

Figure 2:
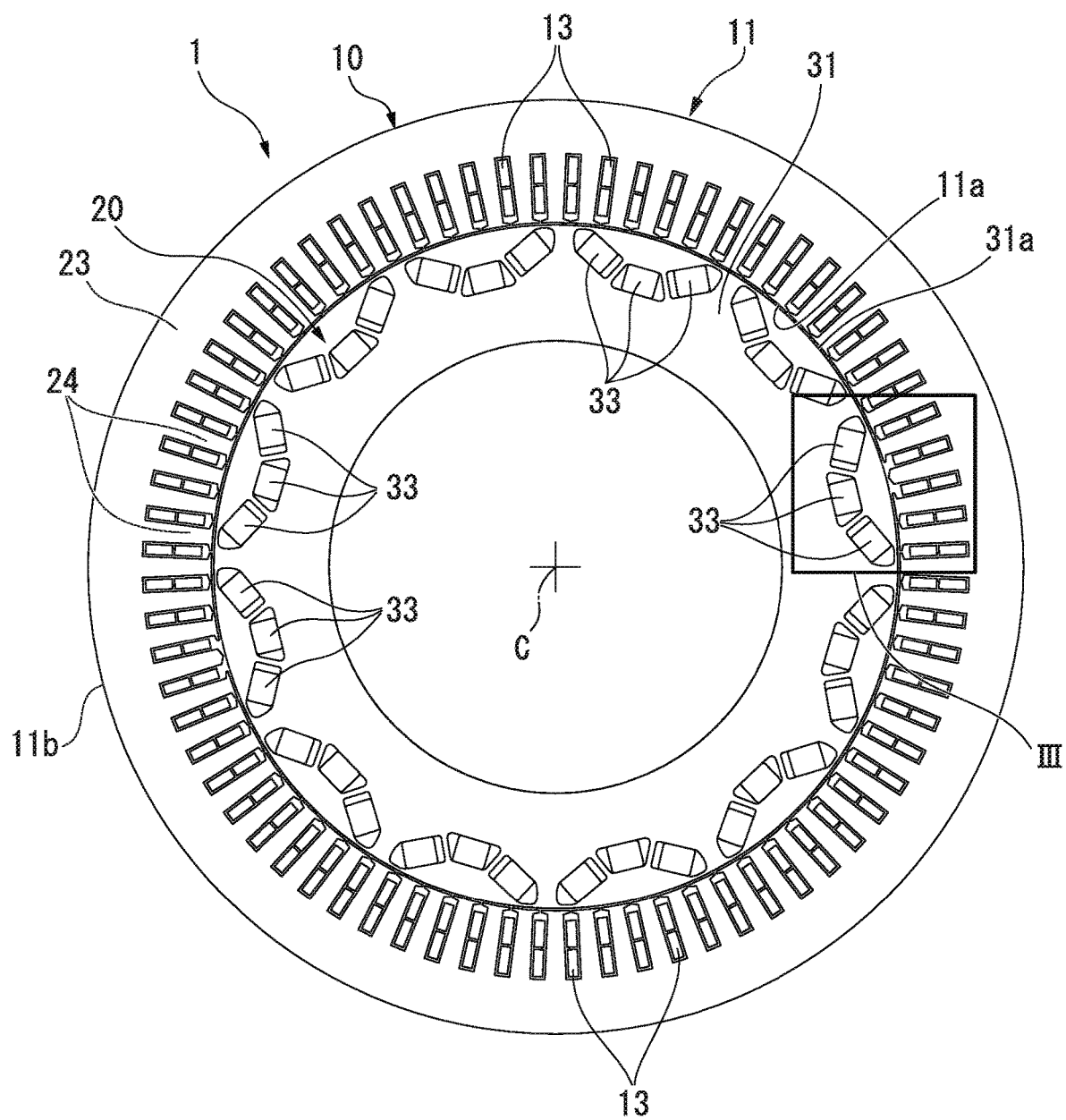
FIG. 2 is a cross-sectional view showing the rotary electric machine according to the first embodiment of the present invention.
Figure 3:
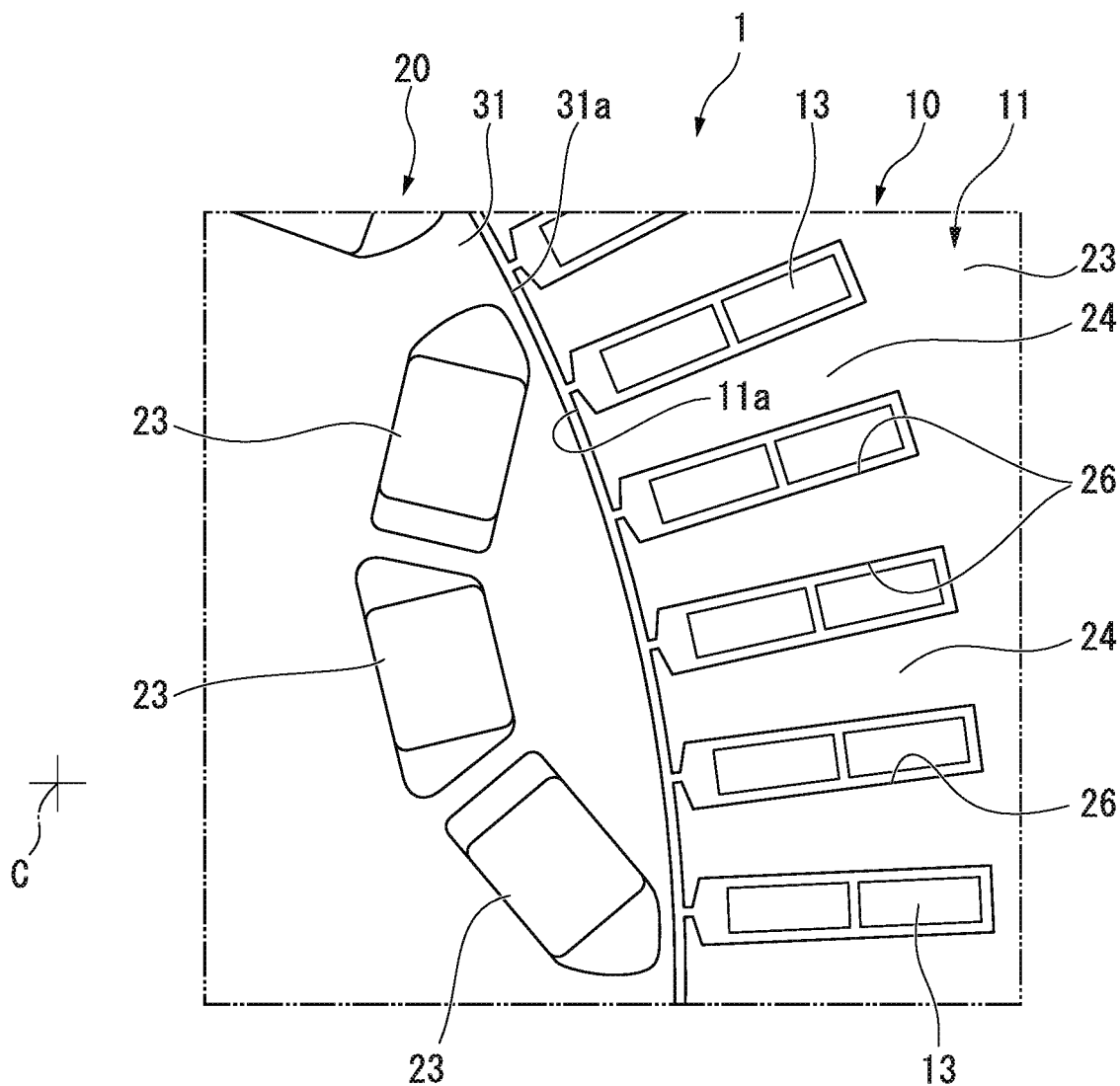
FIG. 3 is a cross-sectional view showing the rotary electric machine according to the first embodiment of the present invention taken along line in FIG. 2.
Figure 4:
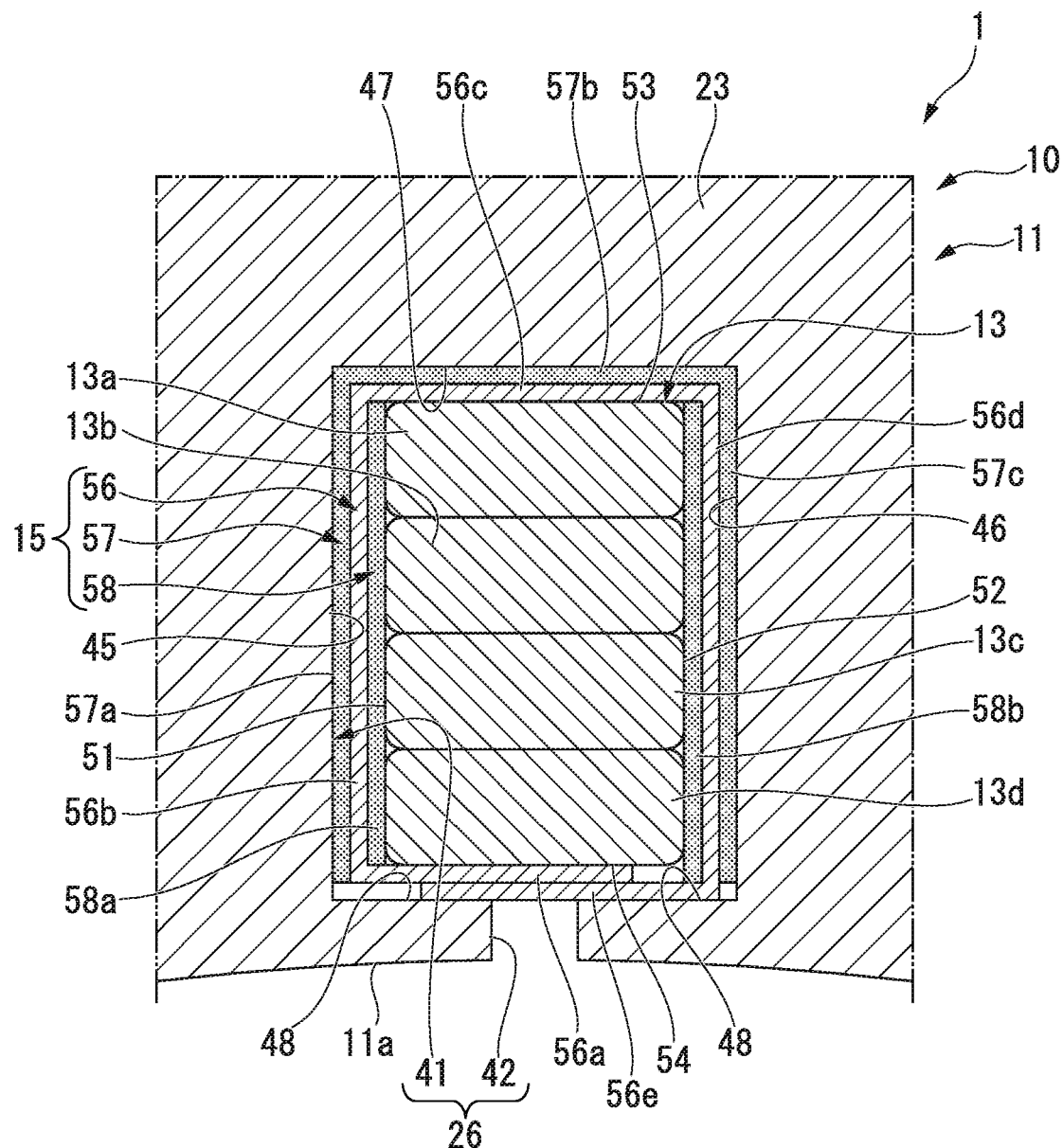
FIG. 4 is a cross-sectional view showing the rotary electric machine according to the first embodiment of the present invention taken along line IV-IV in FIG. 2.

As shown in FIG. 2 and FIG. 3, the stator 10 includes a stator core 11, a plurality phases (for example, a U phase, a V phase and a W phase) of coils 13 mounted on the stator core 11, and a plurality of insulating sheet layers 15 (see FIG. 4).

The stator core 11 is formed in a cylindrical shape that surrounds the rotor 20 from the outside in the radial direction.

The stator core 11 is configured by laminating annular plates obtained by punching electromagnetic steel sheets, or the like, in the axial direction (i.e., a laminating direction). Further, the stator core 11 may be a so-called pressed powder core.

Specifically, the stator core 11 has a back yoke 23 and a plurality of teeth 24. The back yoke 23 is formed in a cylindrical shape disposed coaxially with the axis C.

The plurality of teeth 24 are formed in the circumferential direction at predetermined intervals, and protrude inward from an inner circumferential surface of the back yoke 23 in the radial direction.

Slots 26 are formed between the teeth 24 neighboring in the circumferential direction in groove shapes at predetermined intervals. That is, the plurality of slots 26 are provided in the stator core 11 while being formed alternately with respect to the plurality of teeth 24 in the circumferential direction.

The coils 13 are disposed in the plurality of slots 26, and the coils 13 are attached to the plurality of teeth 24. In this state, the coils 13 are wound on the stator core 11.

The stator 10 generates a magnetic field as current flows to the coils 13.

The rotor 20 is disposed inside the stator 10 in the radial direction. The rotor 20 includes a rotor core 31, a plurality of magnets 33 mounted (buried) in the rotor core 31, and end plates 35 (see FIG. 1) disposed in contact with both end surfaces of the rotor core 31 in the axial direction. The rotor core 31 is formed in a cylindrical shape uniformly extending in the axial direction, and an outer circumferential surface 31*a* is disposed to face an inner circumferential surface 11*a* of the stator core 11. For example, the rotor core 31 is formed by laminating a plurality of electromagnetic steel sheets in the axial direction. The shaft 4 (see FIG. 1) is inserted and fixed into the rotor core 31 through press-fitting or the like.

Accordingly, the rotor core 31 is integrated with the shaft 4 and rotatable around the axis C. The rotor 20 is driven to rotate when a magnetic field generated in the stator 10 repels or attracts the magnets 33.

As shown in FIG. 4, the slots 26 are formed in the stator core 11 to pass in the axial direction. For example, each of the slots 26 has a slot inner circumferential surface (an inner surface) 41 and a slot opening section 42. That is, each of the slots 26 is a so-called open slot that opens on the side of the inner circumferential surface 11*a* in the radial direction.

The slot inner circumferential surface 41 has a first slot inner side surface 45, a second slot inner side surface 46, a first slot inner end surface 47 and a second slot inner end surface 48.

The first slot inner side surface 45 is a side surface of the stator core 11 in the radial direction. The second slot inner side surface 46 is a side surface of the stator core 11 in the radial direction. The first slot inner end surface 47 is an end surface of the stator core perpendicular to the radial direction. The second slot inner end surface 48 is an end surface of the stator core perpendicular to the radial direction. The coils 13 and the insulating sheet layers 15 are inserted into the plurality of slots 26.

The coils 13 are constituted by a plurality of segment coils 13*a* to 13*d* formed of a conductive body having a rectangular cross section. The plurality of segment coils 13*a* to 13*d* are laminated in the radial direction of the stator core 11 from the inner circumferential surface 11*a* of the stator core 11 toward the back yoke 23 (i.e., an outer circumferential surface 11*b* (see FIG. 2)). Each of the plurality of segment coils 13*a* to 13*d* is, for example, a conductive body in which a strand (a copper wire) having a rectangular cross section is coated with an insulating material (an enamel material).

Each of the coils 13 has a first coil side surface 51, a second coil side surface 52, a first coil end surface 53 and a second coil end surface 54.

The first coil side surface 51 is a side surface of the stator core 11 in the radial direction, which is disposed at a position facing the first slot inner side surface 45. The second coil side surface 52 is a side surface of the stator core 11 in the radial direction, which is disposed at a position facing the second slot inner side surface 46.

The first coil end surface 53 is an end surface of the stator core perpendicular to the radial direction, which is disposed at a position facing the first slot inner end surface 47. The second coil end surface 54 is an end surface of the stator core perpendicular to the radial direction, which is disposed at a position facing the second slot inner end surface 48.

The insulating sheet layers 15 are disposed in an O shape between the slots 26 and the coils 13. The insulating sheet layers 15 are disposed in the entire region of the stator core 11 in the lamination thickness direction (i.e., the axial direction of the axis C (see FIG. 1)). For example, each of the insulating sheet layers 15 includes an insulating sheet (specifically, an insulating paper) 56, an outer surface adhesive layer 57 and an inner surface adhesive layer 58.

The insulating sheet 56 is disposed in the entire region of the stator core 11 in the lamination thickness direction. The insulating sheet 56 includes a first sheet section 56*a*, a second sheet section 56*b*, a third sheet section 56*c*, a fourth sheet section 56*d* and a fifth sheet section 56*e*. The insulating sheet 56 is disposed in an O shape with the first sheet section 56*a* and the fifth sheet section 56*e* overlapped on each other.

The outer surface adhesive layer 57 is laminated (applied) on the outer surfaces of the second to fourth sheet sections 56*b* to 56*d* while being overlapped. Specifically, the outer surface adhesive layer 57 includes a first outer surface adhesive layer 57*a*, a second outer surface adhesive layer 57*b* and a third outer surface adhesive layer 57*c*.

The first outer surface adhesive layer 57*a* is laminated on the outer surface of the second sheet section 56*b* while being overlapped. The second outer surface adhesive layer 57*b* is laminated on the outer surface of the third sheet section 56*c* while being overlapped. The third outer surface adhesive layer 57*c* is laminated on the outer surface of the fourth sheet section 56*d* while being overlapped.

The first to third outer surface adhesive layers 57*a* to 57*c* are formed in a layered state in which they are continuous with all surfaces of the second to fourth sheet sections 56*b* to 56*d*, and formed in the entire region of the stator core 11 in the lamination thickness direction. For example, the first to third outer surface adhesive layers 57*a* to 57*c* (i.e., the outer surface adhesive layer 57) include a plurality of spherical foaming agents, and are constituted by a foamed resin as a resin having a thermosetting property (for example, an epoxy resin or the like).

In this way, the first to third outer surface adhesive layers 57*a* to 57*c* are continuous with all of the surfaces of the second to fourth sheet sections 56*b* to 56*d*, and laminated in the entire region of the stator core 11 in the lamination thickness direction. That is, a lamination area of the first to third outer surface adhesive layers 57*a* to 57*c* is largely secured with respect to the second to fourth sheet sections 56*b* to 56*d*.

Accordingly, when the insulating sheet layers 15 are disposed between the slots 26 and the coils 13, the first to third outer surface adhesive layers 57*a* to 57*c* can be prevented from coming in contact with the slot inner circumferential surfaces 41 of the slots 26 and being exfoliated from the second to fourth sheet sections 56*b* to 56*d*. Accordingly, work of disposing the insulating sheet layers 15 between the slots 26 and the coils 13 can be facilitated and productivity can be increased.

Further, for example, in consideration of exfoliation of the first to third outer surface adhesive layers 57a to 57c from the second to fourth sheet sections 56b to 56d, the first to third outer surface adhesive layers 57a to 57c can also be laminated on the slot inner circumferential surfaces 41 of the slots 26.

The inner surface adhesive layer 58 is laminated (applied) on the inner surface of the second sheet section 56b and the inner surface of the fourth sheet section 56d while being overlapped. Specifically, the inner surface adhesive layer 58 includes a first inner surface adhesive layer 58a and a second inner surface adhesive layer 58b.

The first inner surface adhesive layer 58a is laminated on the inner surface of the second sheet section 56b while being overlapped. The second inner surface adhesive layer 58b is laminated on the inner surface of the fourth sheet section 56d while being overlapped. The first inner surface adhesive layer 58a and the second inner surface adhesive layer 58b are disposed in the entire region of the stator core 11 in the lamination thickness direction.

For example, like the outer surface adhesive layer 57, the first inner surface adhesive layer 58a and the second inner surface adhesive layer 58b include a plurality of spherical foaming agents, and are constituted by a foamed resin as a resin having a thermosetting property (for example, an epoxy resin or the like).

The insulating sheet layers 15 are disposed between the slots 26 and the coils 13 in an O shape.

In this state, all of the circumferential surfaces (i.e., the first to fourth coil side surfaces 51 to 54) of the coils 13 are covered with the insulating sheet layers 15. In the insulating sheet layers 15, the first sheet section 56a comes in contact with the second coil end surface 54. The fifth sheet section 56e is overlapped on the outer surface of the first sheet section 56a.

The first sheet section 56a and the fifth sheet section 56e are interposed between the second coil end surface 54 and the second slot inner end surface 48 while being overlapped on each other. The second coil end surface 54 is maintained as a non-adhesive region which is in a state in which the second coil end surface 54 is not fixed to the second slot inner end surface 48.

In addition, the second sheet section 56b, the first inner surface adhesive layer 58a and the first outer surface adhesive layer 57a are interposed between the first coil side surface 51 and the first slot inner side surface 45. Since the first inner surface adhesive layer 58a and the first outer surface adhesive layer 57a are heated, they expand due to foaming together with an increase in temperature. After that, the first inner surface adhesive layer 58a and the first outer surface adhesive layer 57a are cured.

Accordingly, the first coil side surface 51 is fixed (adhered) to the first slot inner side surface 45 via the second sheet section 56b, the first inner surface adhesive layer 58a and the first outer surface adhesive layer 57a. That is, the first coil side surface 51 is maintained as an adhesive region that is in a state in which the first coil side surface 51 is fixed to the first slot inner side surface 45 via the insulating sheet layers 15.

Further, the third sheet section 56c and the second outer surface adhesive layer 57b are interposed between the first coil end surface 53 and the first slot inner end surface 47. Since the second outer surface adhesive layer 57b is heated, the second outer surface adhesive layer 57b expands due to foaming together with an increase in temperature. After that, the second outer surface adhesive layer 57b is cured.

Accordingly, the second sheet section 56b is fixed (adhered) to the first slot inner end surface 47 via the second outer surface adhesive layer 57b. That is, the first coil end surface 53 is maintained as a non-adhesive region that is in a state in which the first coil end surface 53 is not fixed to the first slot inner end surface 47.

In addition, the fourth sheet section 56d, the second inner surface adhesive layer 58b and the third outer surface adhesive layer 57c are interposed between the second coil side surface 52 and the second slot inner side surface 46. Since the second inner surface adhesive layer 58b and the third outer surface adhesive layer 57c are heated, they expand through foaming together with an increase in temperature. After that, the second inner surface adhesive layer 58b and the third outer surface adhesive layer 57c are cured.

Accordingly, the second coil side surface 52 is fixed (adhered) to the second slot inner side surface 46 via the fourth sheet section 56d, the second inner surface adhesive layer 58b and the third outer surface adhesive layer 57c. That is, the second coil side surface 52 is maintained as an adhesive region that is in a state in which the second coil side surface 52 is fixed to the second slot inner side surface 46 via the insulating sheet layers 15.

According to the rotary electric machine 1 of the first embodiment, the first coil end surface 53 serving as a non-adhesive region is held in a state in which the first coil end surface 53 is not fixed to the first slot inner end surface 47. In addition, the second coil end surface 54 serving as a non-adhesive region is held in a state in which the second coil end surface 54 is not fixed to the second slot inner end surface 48. Accordingly, it is possible to prevent the coils 13 from being fixed to the stator core 11 too tightly. Accordingly, it is possible to suppress rigidity of the rotary electric machine 1 from excessively increasing, and it is possible to appropriately secure noise vibration (NV) characteristics.

Meanwhile, the first coil side surface 51 serving as an adhesive region is held in a state in which the first coil side surface 51 is fixed to the first slot inner side surface 45 via the insulating sheet layers 15. In addition, the second coil side surface 52 serving as an adhesive region is held in a state in which the second coil side surface 52 is fixed to the second slot inner side surface 46 via the insulating sheet layers 15.

Accordingly, heat generated by the coils 13 can be appropriately transferred from the first coil side surface 51 via the insulating sheet layers 15 to the stator core 11 via the first slot inner side surface 45. In addition, heat generated by the coils 13 can be appropriately transferred from the second coil side surface 52 via the insulating sheet layers 15 to the stator core 11 via the second slot inner side surface 46. Heat transfer characteristics from the coils 13 to the stator core 11 can be appropriately secured.

Here, for example, the back yoke 23 of the stator core 11 is maintained in a state in which it is cooled by a water cooling structure. Accordingly, heat of the coils 13 transmitted to the stator core is appropriately cooled by the water cooling structure, and cooling characteristics of the coils 13 can be appropriately secured. Accordingly, a temperature of the coils 13 can be appropriately secured.

Next, a stator 70 of a variant of the first embodiment will be described with reference to FIG. 5. Further, in the stator 70 of the variant, the same or similar members of the stator 10 of the first embodiment are designated by the same reference numerals and detailed description thereof will be omitted.

Variant of First Embodiment

Figure 5:
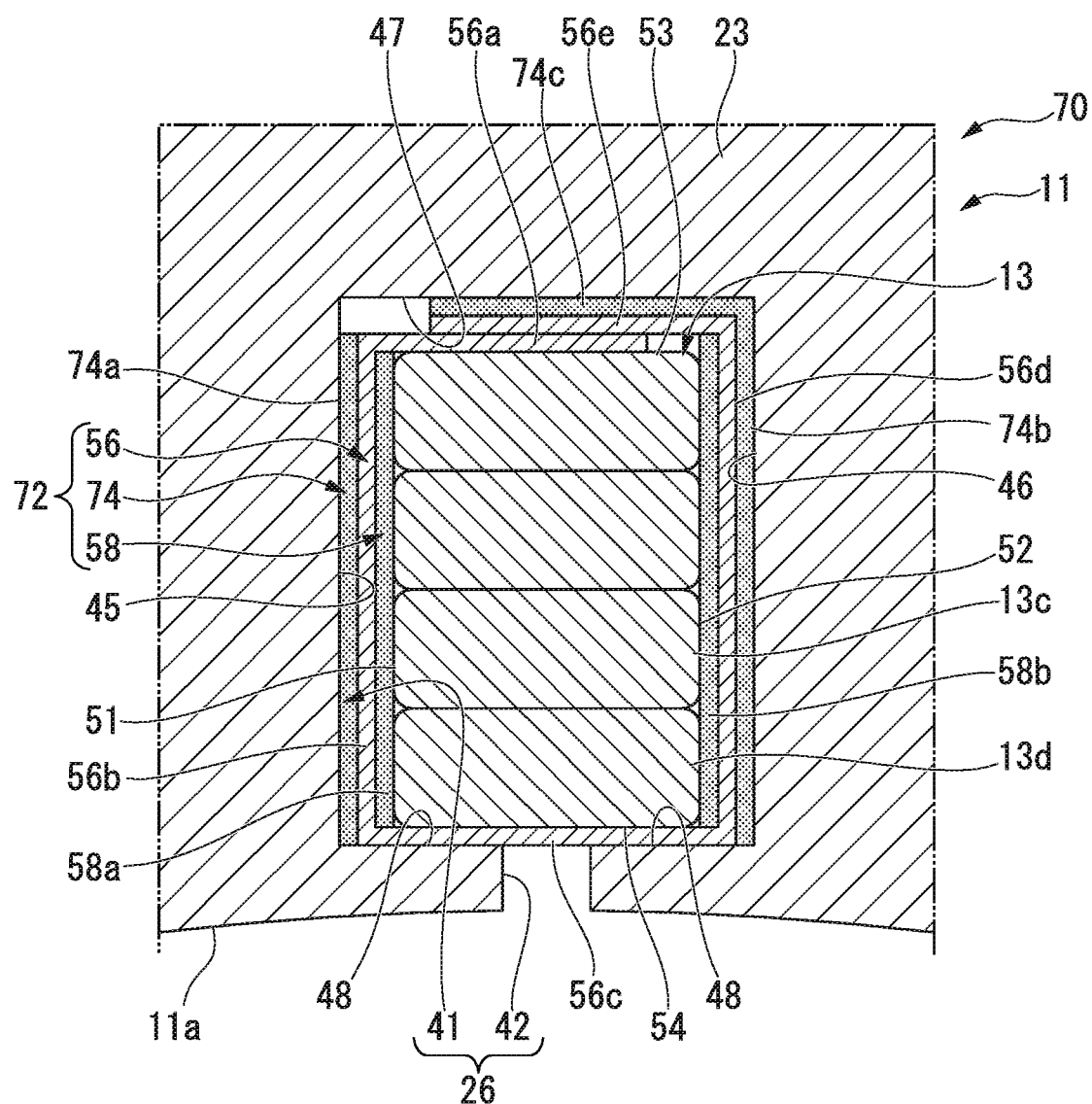
FIG. 5 is a cross-sectional view showing a stator of a rotary electric machine according to a variant of the first embodiment of the present invention.

As shown in FIG. 5, in the stator 70, the insulating sheet layers 15 of the first embodiment are replaced with an insulating sheet layer 72, and the other configuration is similar to the stator 10 of the first embodiment.

In the insulating sheet layer 72, the outer surface adhesive layer 57 of the first embodiment is replaced with an outer surface adhesive layer 74, and the other configuration is similar to the insulating sheet layers 15 of the first embodiment. The insulating sheet layer 72 is disposed in an O shape. Specifically, the insulating sheet layer 72 is disposed on the side of the back yoke 23 in a state in which the first sheet section 56a and the fifth sheet section 56e are overlapped on each other in the radial direction. In addition, the third sheet section 56c of the insulating sheet layer 72 is disposed on the side of the slot opening section 42 (i.e., an air gap). The air gap is referred to as a gap between the inner circumferential surface 11a (see FIG. 2) of the stator core 11 and the outer circumferential surface 31a (see FIG. 2) of the rotor core 31.

The outer surface adhesive layer 74 is laminated while being overlapped on the outer surfaces of the second sheet section 56b, the fourth sheet section 56d and the fifth sheet section 56e. Specifically, the outer surface adhesive layer 74 includes a first outer surface adhesive layer 74a, a second outer surface adhesive layer 74b and a third outer surface adhesive layer 74c.

The first outer surface adhesive layer 74a is laminated while being overlapped on the outer surface of the second sheet section 56b. The second outer surface adhesive layer 74b is laminated while being overlapped on the outer surface of the fourth sheet section 56d. The third outer surface adhesive layer 74c is laminated while being overlapped on the outer surface of the fifth sheet section 56e.

The first outer surface adhesive layer 74a is formed on the entire surface of the second sheet section 56b in a layered state, and formed on the entire region of the stator core 11 in the lamination thickness direction. The second outer surface adhesive layer 74b and the third outer surface adhesive layer 74c are formed in a layered state continuous with all of the surfaces of the fourth sheet section 56d and the fifth sheet section 56e, and formed on the entire region of the stator core 11 in the lamination thickness direction.

The first to third outer surface adhesive layers 74a to 74c (i.e., the outer surface adhesive layer 74) is constituted by, for example, a foamed resin serving as a resin having a thermosetting property (for example, an epoxy resin or the like) while containing a plurality of spherical foaming agents, like the outer surface adhesive layer 57 of the first embodiment.

In this way, the first to third outer surface adhesive layers 74a to 74c are formed on all of the surfaces of the second sheet section 56b, the fourth sheet section 56d and the fifth sheet section 56e in a layered state. That is, a lamination area of the first to third outer surface adhesive layers 74a to 74c is largely secured with respect to the second sheet section 56b, the fourth sheet section 56d and the fifth sheet section 56e.

Accordingly, when the insulating sheet layer 72 is disposed between the slots 26 and the coils 13, it is possible to prevent the first to third outer surface adhesive layers 74a to 74c from coming in contact with the slot inner circumferential surface 41 and being exfoliated from the second sheet section 56b, the fourth sheet section 56d and the fifth sheet section 56e. Accordingly, a work for disposing the insulating sheet layer 72 between the slots 26 and the coils 13 becomes easy, and productivity can be increased.

Further, for example, it is conceivable that the first to third outer surface adhesive layers 74a to 74c are exfoliated from the second sheet section 56b, the fourth sheet section 56d and the fifth sheet section 56e. In consideration of this state, the first to third outer surface adhesive layers 74a to 74c can also be laminated on the slot inner circumferential surfaces 41 of the slots 26.

The insulating sheet layer 72 is disposed between the slots 26 and the coils 13 in an O shape. In this state, all of the circumferential surfaces (i.e., the first to fourth coil side surfaces 51 to 54) of the coils 13 are covered with the insulating sheet layer 72. Specifically, the first sheet section 56a and the fifth sheet section 56e are interposed between the first coil end surface 53 and the first slot inner end surface 47.

Accordingly, the fifth sheet section 56e is fixed (adhered) to the first slot inner end surface 47 via the third outer surface adhesive layer 74c. That is, the first coil end surface 53 is maintained as a non-adhesive region that is in a state in which the first coil end surface 53 is not fixed to the first slot inner end surface 47.

In addition, the second sheet section 56b, the first inner surface adhesive layer 58a and the first outer surface adhesive layer 74a are interposed between the first coil side surface 51 and the first slot inner side surface 45. Accordingly, the first coil side surface 51 is fixed (adhered) to the first slot inner side surface 45 via the second sheet section 56b, the first inner surface adhesive layer 58a and the first outer surface adhesive layer 74a. That is, the first coil side surface 51 is maintained as an adhesive region that is in a state in which the first coil side surface 51 is fixed to the first slot inner side surface 45 via the insulating sheet layer 72.

Further, the third sheet section 56c is interposed between the second coil end surface 54 and the second slot inner end surface 48. The second coil end surface 54 is maintained as a non-adhesive region that is in a state in which the second coil end surface 54 is not fixed (adhered) to the second slot inner end surface 48.

In addition, the fourth sheet section 56d, the second inner surface adhesive layer 58b and the second outer surface adhesive layer 74b is interposed between the second coil side surface 52 and the second slot inner side surface 46. Accordingly, the second coil side surface 52 is fixed (adhered) to the second slot inner side surface 46 via the fourth sheet section 56d, the second inner surface adhesive layer 58b and the second outer surface adhesive layer 74b. That is, the second coil side surface 52 is maintained as an adhesive region that is in a state in which the second coil side surface 52 is fixed to the second slot inner side surface 46 via the insulating sheet layer 72.

According to the stator 70 of the variant of the first embodiment, the same effect as in the stator 10 of the first embodiment is obtained. That is, according to the stator 70 of the variant, the first coil end surface 53 serving as a non-adhesive region is held in a state in which the first coil end surface 53 is not fixed to the first slot inner end surface 47. In addition, the second coil end surface 54 serving as a non-adhesive region is held in a state in which the second coil end surface 54 is not fixed to the second slot inner end surface 48.

Accordingly, it is possible to prevent the coils 13 from being adhered to the stator core 11 too strongly.

Accordingly, it is possible to suppress rigidity of the rotary electric machine 1 from excessively increasing, and NV characteristics can be appropriately secured.

Meanwhile, the first coil side surface 51 serving as an adhesive region is held in a state in which the first coil side surface 51 is fixed to the first slot inner side surface 45 via the insulating sheet layers. In addition, the second coil side surface 52 serving as an adhesive region is held in a state in which the second coil side surface 52 is fixed to the second slot inner side surface 46 via the insulating sheet layers 72.

Accordingly, heat generated by the coils 13 can be appropriately transferred from the first coil side surface 51 via the insulating sheet layers 72 to the stator core 11 via the first slot inner side surface 45. In addition, heat generated by the coils 13 is appropriately transferred from the second coil side surface 52 via the insulating sheet layers 72 to the stator core 11 via the second slot inner side surface 46. Heat transfer characteristics from the coils 13 to the stator core 11 can be appropriately secured.

Here, for example, the back yoke 23 of the stator core 11 is maintained in a state in which it is cooled by the water cooling structure. Accordingly, heat of the coils 13 transferred to the stator core is appropriately cooled by the water cooling structure, and cooling characteristics of the coils 13 are appropriately secured. Accordingly, a temperature of the coils 13 can be appropriately secured.

Next, stators of a second embodiment to a seventh embodiment will be described with reference to FIG. 6 to FIG. 17.

Further, the same or similar components in the second embodiment to the seventh embodiment as/to those of the stator 10 of the first embodiment are designated by the same reference numerals and detailed description thereof will be omitted.

Second Embodiment

Figure 6:
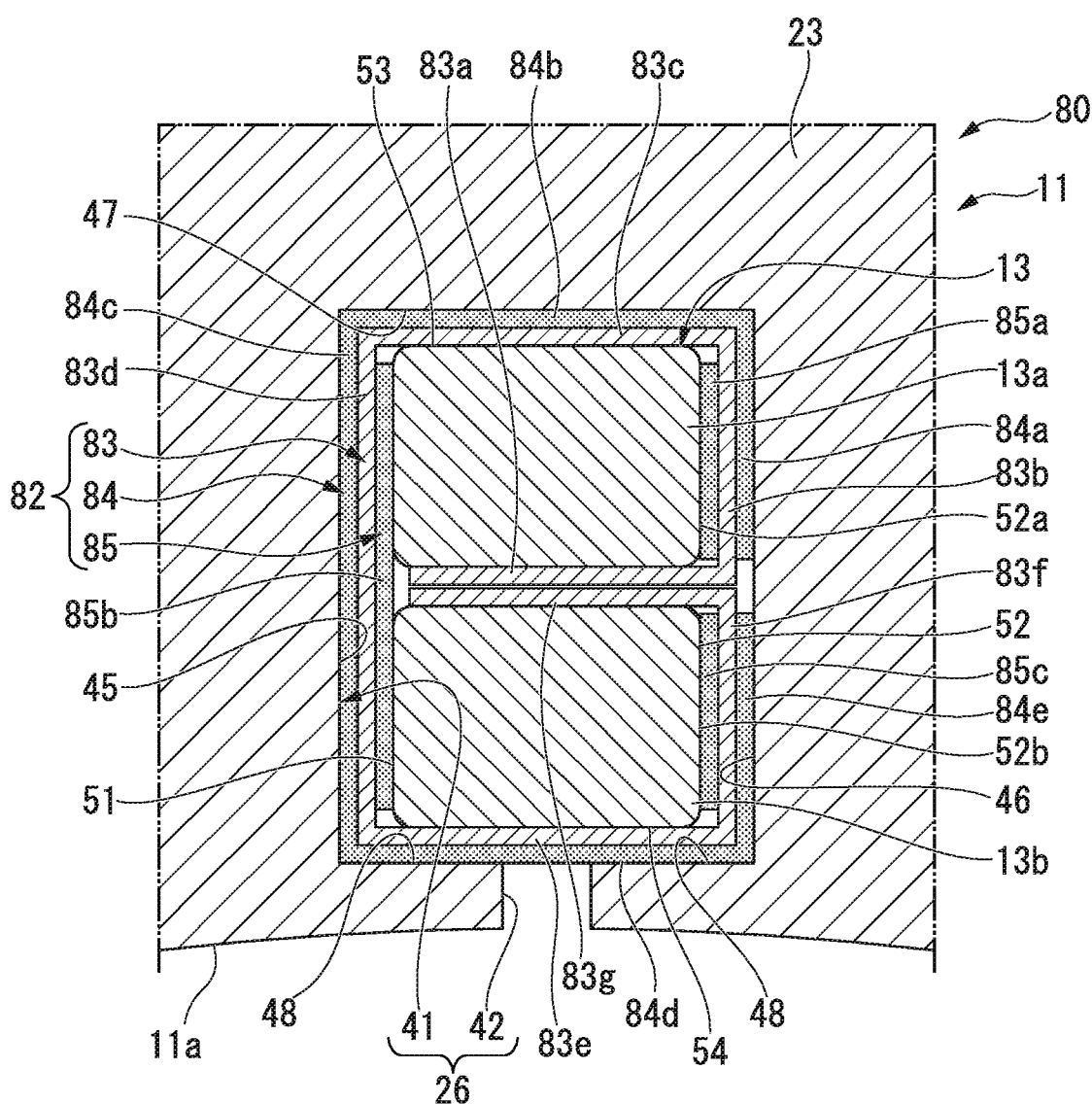
FIG. 6 is a cross-sectional view showing a stator of a rotary electric machine according to a second embodiment of the present invention.

As shown FIG. 6, in a stator 80, the insulating sheet layers 72 of the first embodiment is replaced with an insulating sheet layer 82, and the other configurations are similar to those of the stator 10 of the first embodiment.

The insulating sheet layer 82 is disposed between the slots 26 and the coils 13 in a B shape.

Specifically, the insulating sheet layer 82 is disposed on the entire region of the stator core 11 in the lamination thickness direction. For example, the insulating sheet layer 82 includes an insulating sheet (specifically, an insulating paper) 83, an outer surface adhesive layer 84 and an inner surface adhesive layer 85.

The insulating sheet 83 is disposed on the entire region of the stator core 11 in the lamination thickness direction. The insulating sheet 83 includes a first sheet section 83a, a second sheet section 83b, a third sheet section 83c, a fourth sheet section 83d, a fifth sheet section 83e, a sixth sheet section 83f and a seventh sheet section 83g.

The outer surface adhesive layer 84 is laminated on outer surfaces of the second to sixth sheet sections 83b to 83f while being overlapped on each other. Specifically, the outer surface adhesive layer 84 includes a first outer surface adhesive layer 84a, a second outer surface adhesive layer 84b, a third outer surface adhesive layer 84c, a fourth outer surface adhesive layer 84d and a fifth outer surface adhesive layer 84e.

The first outer surface adhesive layer 84a is laminated on the outer surface of the second sheet section 83b while being overlapped on each other. The second outer surface adhesive layer 84b is laminated on the outer surface of the third sheet section 83c while being overlapped on each other. The third outer surface adhesive layer 84c is laminated on the outer surface of the fourth sheet section 83d while being overlapped on each other. The fourth outer surface adhesive layer 84d is laminated on the outer surface of the fifth sheet section 83e while being overlapped on each other. The fifth outer surface adhesive layer 84e is laminated on the outer surface of the sixth sheet section 83f while being overlapped on each other.

The first to fifth outer surface adhesive layers 84a to 84e are formed in a layered state continuous with all of the surfaces of the second to sixth sheet sections 83b to 83f, and formed on the entire region of the stator core 11 in the lamination thickness direction.

In this way, the first to fifth outer surface adhesive layers 84a to 84e are continuous with all of the surfaces of the second to sixth sheet sections 83b to 83f and formed on the entire region of the stator core 11 in the lamination thickness direction. That is, a lamination area of the first to fifth outer surface adhesive layers 84a to 84e is largely secured with respect to the second to sixth sheet sections 83b to 83f.

Accordingly, when the insulating sheet layer 82 is disposed between the slots 26 and the coils 13, it is possible to prevent the first to fifth outer surface adhesive layers 84a to 84e from coming in contact with the slot inner circumferential surfaces 41 of the slots 26 and being exfoliated from the second to sixth sheet sections 83b to 83f. Accordingly, a work for disposing the insulating sheet layer 82 between the slots 26 and the coils 13 becomes easy, and productivity can be increased.

Further, in consideration of exfoliation of the first to fifth outer surface adhesive layers 84a to 84e from the second to sixth sheet sections 83b to 83f, the first to fifth outer surface adhesive layers 84a to 84e can be laminated (applied) on the slot inner circumferential surfaces 41 of the slots 26.

The inner surface adhesive layer 85 is laminated on an inner surface of the second sheet section 83b, an inner surface of the fourth sheet section 83d and an inner surface of the sixth sheet section 83f while being overlapped on each other. Specifically, the inner surface adhesive layer 85 includes a first inner surface adhesive layer 85a, a second inner surface adhesive layer 85b and a third inner surface adhesive layer 85c.

The first inner surface adhesive layer 85a is laminated on the inner surface of the second sheet section 83b while being overlapped on each other. The second inner surface adhesive layer 85b is laminated on the inner surface of the fourth sheet section 83d while being overlapped on each other. The third inner surface adhesive layer 85c is laminated on the inner surface of the sixth sheet section 83f while being overlapped on each other. The first to third inner surface adhesive layers 85a to 85c are disposed on the entire region of the stator core 11 in the lamination thickness direction.

The insulating sheet layer 82 is disposed between the slots 26 and the coils 13 in a B shape.

The coils 13 include a first segment coil 13a and a second segment coil 13b. The first segment coil 13a is disposed on the side of the back yoke 23. The second segment coil 13b is disposed on the side of the slot opening section 42 (i.e., an air gap).

In this state, all of the circumferential surfaces (i.e., the first to fourth coil side surfaces 51 to 54) of the coils 13 are covered with the insulating sheet layer 82. The first sheet section 83a and the seventh sheet section 83g are interposed between the first segment coil 13a and the second segment coil 13b while being sandwiched therebetween.

In addition, the second sheet section 83b, the first inner surface adhesive layer 85a and the first outer surface adhesive layer 84a are interposed between an area 52a of the first segment coil 13a on the second coil side surface 52 and the second slot inner side surface 46. Hereinafter, "the area 52a of the first segment coil 13a on the second coil side surface 52" is referred to as "a second outer coil side surface 52a."

Accordingly, the second outer coil side surface 52*a* is fixed (adhered) to the second slot inner side surface 46 via the second sheet section 83*b*, the first inner surface adhesive layer 85*a* and the first outer surface adhesive layer 84*a*. That is, the second outer coil side surface 52*a* is maintained as an adhesive region that is in a state in which the second outer coil side surface 52*a* is fixed to the second slot inner side surface 46 via the insulating sheet layer 82.

In addition, the third sheet section 83*c* and the second outer surface adhesive layer 84*b* are interposed between the first coil end surface 53 and the first slot inner end surface 47. The third sheet section 83*c* is fixed (adhered) to the first slot inner end surface 47 by the second outer surface adhesive layer 84*b*. The first coil end surface 53 is maintained as a non-adhesive region that is in a state in which the first coil end surface 53 is not fixed (adhered) to the first slot inner end surface 47.

Further, the fourth sheet section 83*d*, the second inner surface adhesive layer 85*b* and the third outer surface adhesive layer 84*c* are interposed between the first coil side surface 51 and the first slot inner side surface 45. Accordingly, the first coil side surface 51 is fixed (adhered) to the first slot inner side surface 45 via the fourth sheet section 83*d*, the second inner surface adhesive layer 85*b* and the third outer surface adhesive layer 84*c*. That is, the first coil side surface 51 is maintained as an adhesive region that is in a state in which the first coil side surface 51 is fixed to the first slot inner side surface 45 via the insulating sheet layer 82.

In addition, the fifth sheet section 83*e* and the fourth outer surface adhesive layer 84*d* is interposed between the second coil end surface 54 and the second slot inner end surface 48. The fifth sheet section 83*e* is fixed (adhered) to the second slot inner end surface 48 by the fourth outer surface adhesive layer 84*d*. The second coil end surface 54 is maintained as a non-adhesive region that is in a state in which the second coil end surface 54 is not fixed to the second slot inner end surface 48.

In addition, the sixth sheet section 83*f*, the third inner surface adhesive layer 85*c* and the fifth outer surface adhesive layer 84*e* are interposed between an area 52*b* of the second segment coil 13*b* in the second coil side surface 52 and the second slot inner side surface 46. Hereinafter, "the area 52*b* of the second segment coil 13*b* in the second coil side surface 52" is referred to as "a second inner coil side surface 52*b*."

Accordingly, the second inner coil side surface 52*b* is fixed (adhered) to the second slot inner side surface 46 via the sixth sheet section 83*f*, the third inner surface adhesive layer 85*c* and the fifth outer surface adhesive layer 84*e*. That is, the second inner coil side surface 52*b* is maintained as an adhesive region that is in a state in which the second inner coil side surface 52*b* is fixed to the second slot inner side surface 46 via the insulating sheet layer 82.

Here, the second outer coil side surface 52*a* is also maintained as an adhesive region fixed (adhered) to the second slot inner side surface 46 via the insulating sheet layer 82.

In addition, the second coil side surface 52 is constituted by the second outer coil side surface 52*a* and the second inner coil side surface 52*b*. Accordingly, the second coil side surface 52 is maintained as an adhesive region that is in a state in which the second coil side surface 52 is fixed to the second slot inner side surface 46 via the insulating sheet layer 82.

According to the stator 80 of the second embodiment, the first coil end surface 53 serving as a non-adhesive region is held in a state in which the first coil end surface 53 is not fixed to the first slot inner end surface 47. In addition, the second coil end surface 54 serving as a non-adhesive region is held in a state in which the second coil end surface 54 is not fixed to the second slot inner end surface 48.

Accordingly, it is possible to prevent the coils 13 from being adhered to the stator core 11 too strongly.

Accordingly, it is possible to suppress rigidity of the rotary electric machine 1 from excessively increasing, and NV characteristics can be appropriately secured.

Meanwhile, the first coil side surface 51 serving as an adhesive region is held in a state in which the first coil side surface 51 is fixed to the first slot inner side surface 45 via the insulating sheet layer 82. In addition, the second coil side surface 52 serving as an adhesive region is held in a state in which the second coil side surface 52 is fixed to the second slot inner side surface 46 via the insulating sheet layer 82.

Accordingly, heat generated by the coils 13 can be appropriately transferred from the first coil side surface 51 via the insulating sheet layer 82 to the stator core 11 via the first slot inner side surface 45. In addition, heat generated by the coils 13 can be appropriately transferred from the second coil side surface 52 via the insulating sheet layer 82 to the stator core 11 via the second slot inner side surface 46. Heat transfer characteristics from the coils 13 to the stator core 11 can be appropriately secured.

Here, for example, the back yoke 23 of the stator core 11 is maintained in a state in which the back yoke 23 is cooled by the water cooling structure. Accordingly, heat of the coils 13 transmitted to the stator core is appropriately cooled by the water cooling structure, and cooling characteristics of the coils 13 are appropriately secured. Accordingly, a temperature of the coils 13 can be appropriately secured.

Next, a stator 90 of a first variant of the second embodiment will be described with reference to FIG. 7.

First Variant of Second Embodiment

Figure 7:
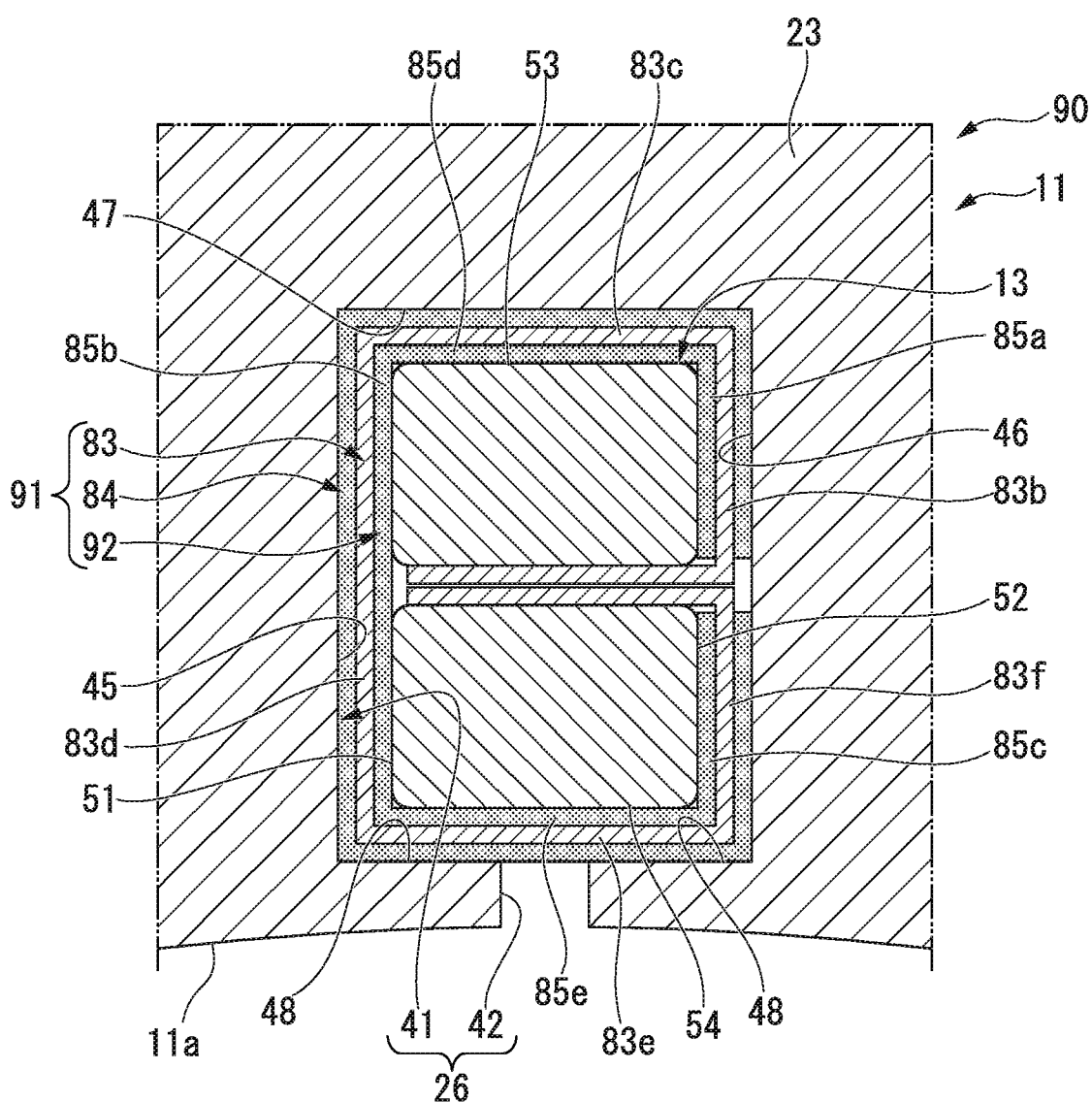
FIG. 7 is a cross-sectional view showing a stator of a rotary electric machine according to a first variant of the second embodiment of the present invention.

As shown in FIG. 7, in the stator 90, the insulating sheet layer 82 of the second embodiment is replaced with an insulating sheet layer 91, and the other configurations are similar to the stator 80 of the second embodiment.

The insulating sheet layer 91 includes, for example, the insulating sheet 83, the outer surface adhesive layer 84 and an inner surface adhesive layer 92. That is, in the insulating sheet layer 91, the inner surface adhesive layer 85 of the insulating sheet layer 82 of the second embodiment is replaced with the inner surface adhesive layer 92, and the other configurations are similar to the insulating sheet layer 82 of the second embodiment.

The inner surface adhesive layer 92 includes a fourth inner surface adhesive layer 85*d* and a fifth inner surface adhesive layer 85*e*, in addition to the inner surface adhesive layer 85 (see FIG. 6) of the second embodiment.

The fourth inner surface adhesive layer 85*d* is interposed between the first inner surface adhesive layer 85*a* and the second inner surface adhesive layer 85*b*, and formed to be continuous with the inner surface adhesive layers 85*a* and 85*b*. The fourth inner surface adhesive layer 85*d* is laminated on the entire inner surface of the third sheet section 83*c* while being overlapped on each other.

The fifth inner surface adhesive layer 85*e* is interposed between the second inner surface adhesive layer 85*b* and the third inner surface adhesive layer 85*c*, and formed to be continuous with the inner surface adhesive layers 85*b* and 85*c*. The fifth inner surface adhesive layer 85*e* is laminated on the entire inner surface of a fifth sheet section 83*d* while being overlapped on each other.

That is, the first to fifth inner surface adhesive layers 85*a* to 85*e* (the inner surface adhesive layer 92) are integrally formed in a layered shape continuous with all of the surfaces of the second sheet section 83*b* to the sixth sheet section 83*f*. Accordingly, a lamination area of the first to fifth inner surface adhesive layers 85*a* to 85*e* is easily secured with respect to the second to sixth sheet sections 83*b* to 83*f*.

Here, when the insulating sheet layer 91 is disposed between the slots 26 and the coils 13, the first to fifth inner surface adhesive layers 85*a* to 85*e* come in contact with the first coil side surface 51, the second coil side surface 52, the first coil end surface 53 and the second coil end surface 54.

In this state, a lamination area of the first to fifth inner surface adhesive layers 85*a* to 85*e* is largely secured with respect to the second to sixth sheet sections 83*b* to 83*f*. Accordingly, exfoliation of the first to fifth inner surface adhesive layers 85*a* to 85*e* from the second to sixth sheet sections 83*b* to 83*f* can be prevented. Accordingly, a work for disposing the insulating sheet layer 91 between the slots 26 and the coils 13 becomes easy, and productivity can be increased.

Next, a stator 100 of a second variant of the second embodiment will be described with reference to FIG. 8.

Second Variant of Second Embodiment

Figure 8:
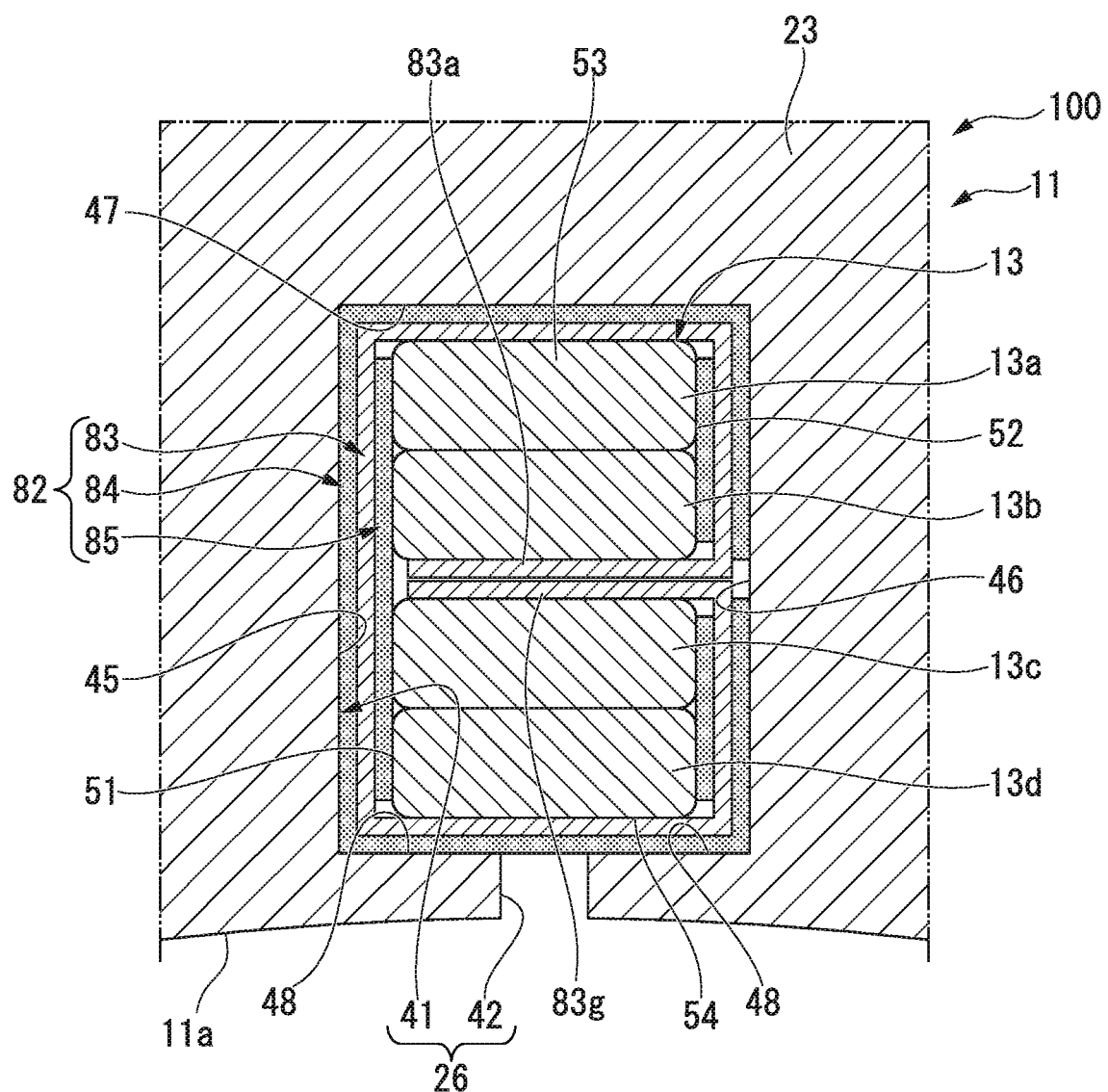
FIG. 8 is a cross-sectional view showing a stator of a rotary electric machine according to a second variant of the second embodiment of the present invention.

As shown in FIG. 8, in the stator 100, the number of the segment coils of the coils 13 is increased, and the other configurations are similar to the stator 80 of the second embodiment.

The coils 13 include a first segment coil 13*a*, a second segment coil 13*b*, a third segment coil 13*c* and a fourth segment coil 13*d*.

The coils 13 are laminated from the back yoke 23 toward the slot opening section 42 (i.e., an air gap) in the radial direction.

The coils 13 are formed to a large size in comparison with the coils 13 of the second embodiment when the coils 13 are constituted by the four segment coils 13*a* to 13*d*.

In the stator 100 of the second variant, like the second embodiment, the insulating sheet layer 82 is disposed between the slots 26 and the coils 13 in a B shape. In this state, all of the circumferential surfaces (i.e., the first to fourth coil side surfaces 51 to 54) of the coils 13 are covered with the insulating sheet layer 82. The first sheet section 83*a* and the seventh sheet section 83*g* are interposed between the second segment coil 13*b* and the third segment coil 13*c* while being sandwiched therebetween.

According to the stator 100 of the second variant, like the stator 80 of the first embodiment, the first coil end surface 53 serving as a non-adhesive region is held in a state in which the first coil end surface 53 is not fixed (adhered) to the first slot inner end surface 47. In addition, the second coil end surface 54 serving as a non-adhesive region is held in a state in which the second coil end surface 54 is not fixed (adhered) to the second slot inner end surface 48.

Accordingly, it is possible to prevent the coils 13 from being adhered to the stator core 11 too strongly.

Accordingly, it is possible to prevent rigidity of the rotary electric machine 1 from excessively increasing, and NV characteristics can be appropriately secured.

Meanwhile, the first coil side surface 51 serving as an adhesive region is held in a state in which the first coil side surface 51 is fixed to the first slot inner side surface 45 via the insulating sheet layer 82. In addition, the second coil side surface 52 serving as an adhesive region is held in a state in which the second coil side surface 52 is fixed (adhered) to the second slot inner side surface 46 via the insulating sheet layer 82.

Accordingly, heat generated by the coils 13 can be appropriately transferred from the first coil side surface 51 via the insulating sheet layer 82 to the stator core 11 via the first slot inner side surface 45. In addition, heat generated by the coils 13 can be appropriately transferred from the second coil side surface 52 via the insulating sheet layer 82 to the stator core 11 via the second slot inner side surface 46. Heat transfer characteristics from the coils 13 to the stator core 11 can be appropriately secured.

Here, for example, the back yoke 23 of the stator core 11 is maintained in a state in which it is cooled by the water cooling structure. Accordingly, heat of the coils 13 transferred to the stator core is appropriately cooled by the water cooling structure, and cooling characteristics of the coils 13 are appropriately secured. Accordingly, a temperature of the coils 13 can be appropriately secured.

Next, a stator 110 of a third variant of the second embodiment will be described with reference to FIG. 9.

Third Variant of Second Embodiment

Figure 9:
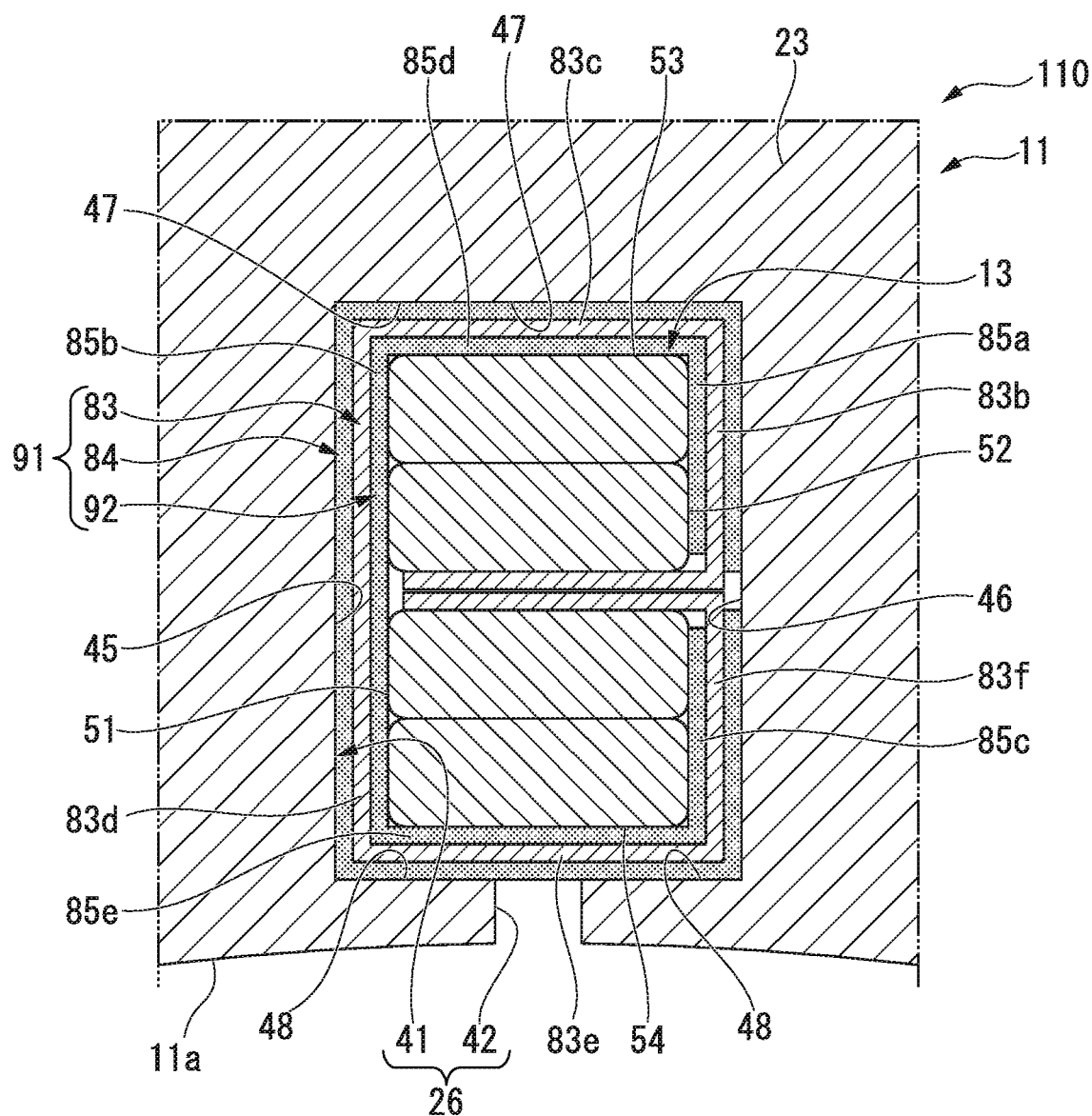
FIG. 9 is a cross-sectional view showing a stator of a rotary electric machine according to a third variant of the second embodiment of the present invention.

As shown in FIG. 9, in the stator 110, the insulating sheet layer 82 of the second variant of the second embodiment is replaced with the insulating sheet layer 91, and the other configurations are similar to the stator 100 of the second variant of the second embodiment.

The insulating sheet layer 91 includes, for example, the insulating sheet 83, the outer surface adhesive layer 84 and the inner surface adhesive layer 92. That is, in the insulating sheet layer 91, the inner surface adhesive layer 85 of the insulating sheet layer 82 of the second variant of the second embodiment is replaced with the inner surface adhesive layer 92, and the other configurations are similar to the insulating sheet layer 82 of the second variant of the second embodiment.

The inner surface adhesive layer 92 includes a fourth inner surface adhesive layer 85*d* and a fifth inner surface adhesive layer 85*e*, in addition to the inner surface adhesive layer 85 (see FIG. 6) of the second embodiment.

The fourth inner surface adhesive layer 85*d* is interposed between the first inner surface adhesive layer 85*a* and the second inner surface adhesive layer 85*b*, and formed to be continuous with the inner surface adhesive layers 85*a* and 85*b*. The fourth inner surface adhesive layer 85*d* is laminated on the entire inner surface of the third sheet section 83*c* while being overlapped on each other.

The fifth inner surface adhesive layer 85*e* is interposed between the second inner surface adhesive layer 85*b* and the third inner surface adhesive layer 85*c*, and formed to be continuous with the inner surface adhesive layers 85*b* and 85*c*. The fifth inner surface adhesive layer 85*e* is laminated on the entire inner surface of the fifth sheet section 83*e* while being overlapped on each other.

That is, the first to fifth inner surface adhesive layers 85*a* to 85*e* (the inner surface adhesive layer 92) are integrally formed in a layered shape continuous with all of the surfaces of the second sheet section 83*b* to the sixth sheet section 83*f*. Accordingly, a lamination area of the first to fifth inner surface adhesive layers 85*a* to 85*e* with respect to the second to sixth sheet sections 83*b* to 83*f* is largely secured.

Here, when the insulating sheet layer 91 is disposed between the slots 26 and the coils 13, the insulating sheet layer 91 comes in contact with the first coil side surface 51, the second coil side surface 52, the first coil end surface 53 and the second coil end surface 54.

In this state, a lamination area of the first to fifth inner surface adhesive layers 85a to 85e is largely secured with respect to the second to sixth sheet sections 83b to 83f. Accordingly, exfoliation of the first to fifth inner surface adhesive layers 85a to 85e from the second to sixth sheet sections 83b to 83f can be prevented. Accordingly, a work for disposing the insulating sheet layer 91 between the slots 26 and the coils 13 becomes easy, and productivity can be increased.

Third Embodiment

Figure 10:
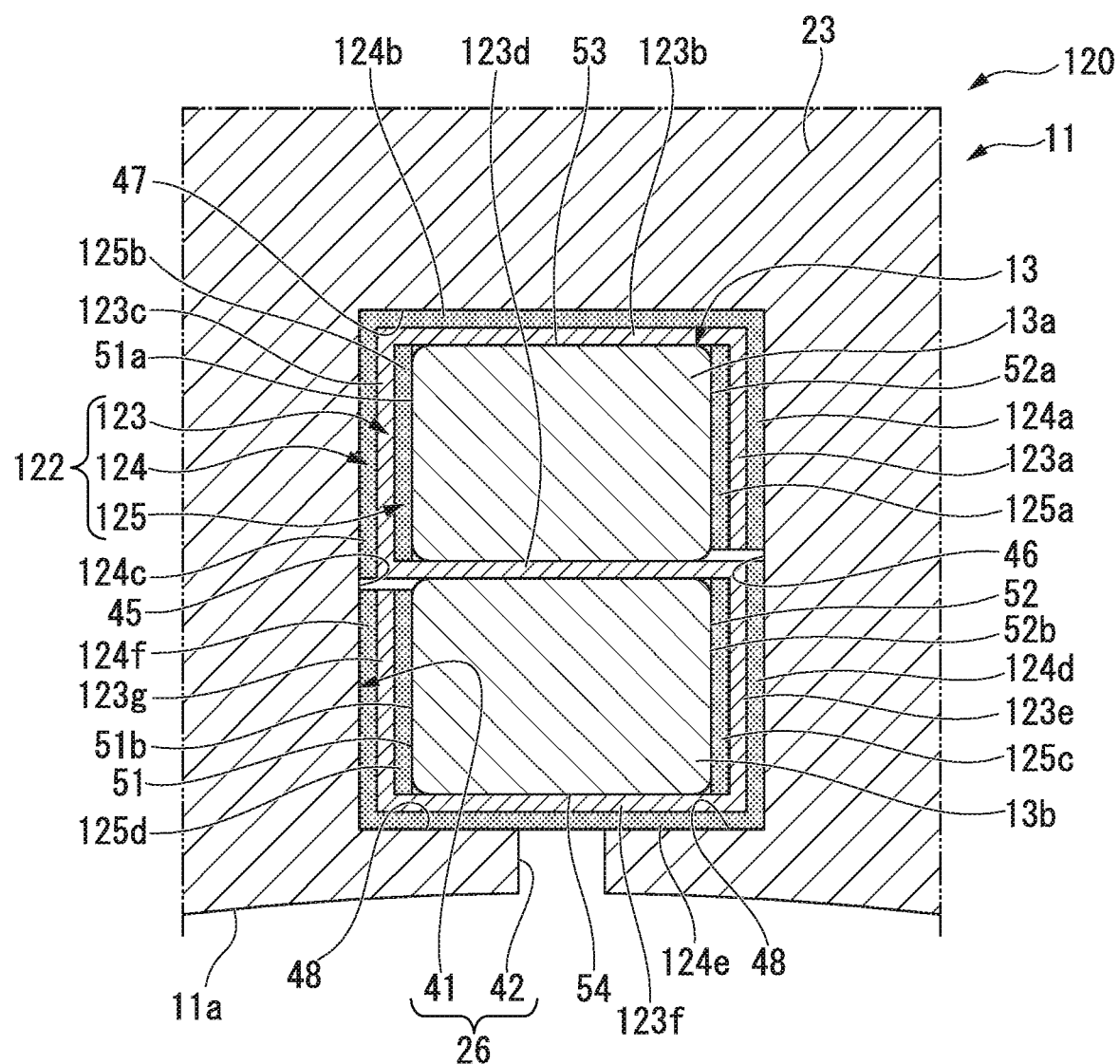
FIG. 10 is a cross-sectional view showing a stator of a rotary electric machine according to a third embodiment of the present invention.

As shown in FIG. 10, in a stator 120, the insulating sheet layers 15 of the first embodiment are replaced with an insulating sheet layer 122, and the other configurations are similar to the stator 10 of the first embodiment.

The insulating sheet layer 122 is disposed between the slots 26 and the coils 13 in an S shape. Specifically, the insulating sheet layer 122 is disposed on the entire region of the stator core 11 in the lamination thickness direction. The insulating sheet layer 122 includes, for example, an insulating sheet (an insulating paper) 123, an outer surface adhesive layer 124 and an inner surface adhesive layer 125.

The insulating sheet 123 is disposed on the entire region of the stator core 11 in the lamination thickness direction.

The insulating sheet 123 includes a first sheet section 123a, a second sheet section 123b, a third sheet section 123c, a fourth sheet section 123d, a fifth sheet section 123e, a sixth sheet section 123f and a seventh sheet section 123g. The insulating sheet 123 is disposed in an S shape.

The outer surface adhesive layer 124 is laminated on outer surfaces of the first to third sheet sections 123a to 123c and outer surfaces of the fifth to seventh sheet sections 123e to 123g while being overlapped on each other. Specifically, the outer surface adhesive layer 124 includes a first outer surface adhesive layer 124a, a second outer surface adhesive layer 124b, a third outer surface adhesive layer 124c, a fourth outer surface adhesive layer 124d, a fifth outer surface adhesive layer 124e and a sixth outer surface adhesive layer 124f.

The first outer surface adhesive layer 124a is laminated on the outer surface of the first sheet section 123a while being overlapped on each other. The second outer surface adhesive layer 124b is laminated on the outer surface of the second sheet section 123b while being overlapped on each other. The third outer surface adhesive layer 124c is laminated on the outer surface of the third sheet section 123c while being overlapped on each other.

The fourth outer surface adhesive layer 124d is laminated on the outer surface of the fifth sheet section 123e while being overlapped on each other. The fifth outer surface adhesive layer 124e is laminated on the outer surface of the sixth sheet section 123f while being overlapped on each other. The sixth outer surface adhesive layer 124f is laminated on the outer surface of the seventh sheet section 123g while being overlapped on each other.

The first to third outer surface adhesive layers 124a to 124c are formed in a layered state continuous with all of the surfaces of the first to third sheet sections 123a to 123c, and formed on the entire region of the stator core 11 in the lamination thickness direction.

The first to third outer surface adhesive layers 124a to 124c are continuous with all of the surfaces of the first to third sheet sections 123a to 123c and formed on the entire region of the stator core 11 in the lamination thickness direction. That is, a lamination area of the first to third outer surface adhesive layers 124a to 124c with respect to the first to third sheet sections 123a to 123c can be largely secured.

In addition, the fourth to sixth outer surface adhesive layers 124d to 124f are formed in a layered state continuous with all of the surfaces of the fifth to seventh sheet sections 123e to 123g, and formed on the entire region of the stator core 11 in the lamination thickness direction.

The fourth to sixth outer surface adhesive layers 124d to 124f are continuous with all of the surfaces of the fifth to seventh sheet sections 123e to 123g, and formed on the entire region of the stator core 11 in the lamination thickness direction. That is, a lamination area of the fourth to sixth outer surface adhesive layers 124d to 124f with respect to the fifth to seventh sheet sections 123e to 123g can be largely secured.

Accordingly, when the insulating sheet layer 122 is disposed between the slots 26 and the coils 13, it is possible to prevent the first to third outer surface adhesive layers 124a to 124c from coming in contact with the slot inner circumferential surfaces 41 of the slots 26 and from being exfoliated from the first to third sheet sections 123a to 123c. In addition, it is possible to prevent the fourth to sixth outer surface adhesive layers 124d to 124f from coming in contact with the slot inner circumferential surfaces 41 of the slots 26 and from being exfoliated from the fifth to seventh sheet sections 123e to 123g.

Accordingly, a work for disposing the insulating sheet layer 122 between the slots 26 and the coils 13 becomes easy, and productivity can be increased.

Further, in consideration of exfoliation of the first to third outer surface adhesive layers 124a to 124c from the first to third sheet sections 123a to 123c, the first to third outer surface adhesive layers 124a to 124e can be laminated (applied) on the slot inner circumferential surfaces 41 of the slots 26.

In addition, in consideration of exfoliation of the fourth to sixth outer surface adhesive layers 124d to 124f from the fifth to seventh sheet sections 123e to 123g, the fourth to sixth outer surface adhesive layers 124d to 124f can be laminated (applied) on the slot inner circumferential surfaces 41 of the slots 26.

The inner surface adhesive layer 125 is laminated on the inner surface of the first sheet section 123a, the inner surface of the third sheet section 123c, the inner surface of the fifth sheet section 123e and the inner surface of the seventh sheet section 123g while being overlapped on each other. Specifically, the inner surface adhesive layer 125 includes a first inner surface adhesive layer 125a, a second inner surface adhesive layer 125b, a third inner surface adhesive layer 125c and a fourth inner surface adhesive layer 125d.

The first inner surface adhesive layer 125a is laminated on the inner surface of the first sheet section 123a while being overlapped on each other. The second inner surface adhesive layer 125b is laminated on the inner surface of the third sheet section 123c while being overlapped on each other. The third inner surface adhesive layer 125c is laminated on the inner surface of the fifth sheet section 123e while being overlapped on each other. The fourth inner surface adhesive layer 125d is laminated on the inner surface of the seventh sheet section 123g while being overlapped on each other. The first to third inner surface adhesive layers 125a to 125d are disposed on the entire region of the stator core 11 in the lamination thickness direction.

The insulating sheet layer 122 is disposed between the slots 26 and the coils 13 in an S shape.

The coils 13 include the first segment coil 13a and the second segment coil 13b. The first segment coil 13a is disposed on the side of the back yoke 23. The second segment coil 13b is disposed on the side of the slot opening section 42 (i.e., an air gap).

In this state, the entire circumferential surfaces (i.e., the first to fourth coil side surfaces 51 to 54) of the coils 13 are covered with the insulating sheet layer 122. Specifically, the first sheet section 123a, the first inner surface adhesive layer 125a and the first outer surface adhesive layer 124a are interposed between the area 52a of the first segment coil 13a in the second coil side surface 52 and the second slot inner side surface 46. Hereinafter, "the area 52a of the first segment coil 13a in the second coil side surface 52" is referred to as "the second outer coil side surface 52a."

Accordingly, "the second outer coil side surface 52a" is fixed (adhered) to the second slot inner side surface 46 via the first sheet section 123a, the first inner surface adhesive layer 125a and the first outer surface adhesive layer 124a. That is, "the second outer coil side surface 52a" is maintained as an adhesive region that is in a state in which the second outer coil side surface 52a is fixed to the second slot inner side surface 46 via the insulating sheet layer 122.

In addition, the second sheet section 123b and the second outer surface adhesive layer 124b are interposed between the first coil end surface 53 and the first slot inner end surface 47. The second sheet section 123b is fixed (adhered) to the first slot inner end surface 47 by the second outer surface adhesive layer 124b. The first coil end surface 53 is maintained as a non-adhesive region that is in a state in which the first coil end surface 53 is not fixed to the first slot inner end surface 47.

Further, the third sheet section 123c, the second inner surface adhesive layer 125b and the third outer surface adhesive layer 124c are interposed between an area 51a of the first segment coil 13a in the first coil side surface 51 and the first slot inner side surface 45. Hereinafter, "the area 51a of the first segment coil 13a in the first coil side surface 51" is referred to as "a first outer coil side surface 51a."

Accordingly, the first outer coil side surface 51a is fixed (adhered) to the first slot inner side surface 45 via the third sheet section 123c, the second inner surface adhesive layer 125b and the third outer surface adhesive layer 124c. That is, the first outer coil side surface 51a is maintained as an adhesive region that is in a state in which the first outer coil side surface 51a is fixed to the first slot inner side surface 45 via the insulating sheet layer 122.

In addition, the fourth sheet section 123d is interposed between the first segment coil 13a and the second segment coil 13b while being sandwiched therebetween. That is, the first segment coil 13a comes in contact with the fourth sheet section 123d, and the second segment coil 13b comes in contact with the fourth sheet section 123d.

Further, the fifth sheet section 123e, the third inner surface adhesive layer 125c and the fourth outer surface adhesive layer 124d are interposed between the area 52b of the second segment coil 13b in the second coil side surface 52 and the second slot inner side surface 46. Hereinafter, "the area 52b of the second segment coil 13b in the second coil side surface 52" is referred to as "the second inner coil side surface 52b."

Accordingly, "the second inner coil side surface 52b" is fixed (adhered) to the second slot inner side surface 46 via the fifth sheet section 123e, the third inner surface adhesive layer 125c and the fourth outer surface adhesive layer 124d. That is, "the second inner coil side surface 52b" is maintained as an adhesive region that is in a state in which the second inner coil side surface 52b is fixed to the second slot inner side surface 46 via the insulating sheet layer 122.

In addition, the second outer coil side surface 52a is maintained as an adhesive region fixed to the second slot inner side surface 46 via the insulating sheet layer 122.

Here, the second coil side surface 52 is constituted by the second outer coil side surface 52a and the second inner coil side surface 52b. Accordingly, the second coil side surface 52 is maintained as an adhesive region that is in a state in which the second coil side surface 52 is fixed to the second slot inner side surface 46 via the insulating sheet layer 122.

In addition, the sixth sheet section 123f and the fifth outer surface adhesive layer 124e are interposed between the second coil end surface 54 and the second slot inner end surface 48. The sixth sheet section 123f is fixed (adhered) to the second slot inner end surface 48 by the fifth outer surface adhesive layer 124e. The second coil end surface 54 is maintained as a non-adhesive region that is in a state in which the second coil end surface 54 is not fixed to the second slot inner end surface 48.

Further, the seventh sheet section 123g, the fourth inner surface adhesive layer 125d and the sixth outer surface adhesive layer 124f are interposed between an area 51b of the second segment coil 13b in the first coil side surface 51 and the first slot inner side surface 45. Hereinafter, "the area 51b of the second segment coil 13b in the first coil side surface 51" is referred to as "a first inner coil side surface 51b."

Accordingly, the first inner coil side surface 51b is fixed (adhered) to the first slot inner side surface 45 via the seventh sheet section 123g, the fourth inner surface adhesive layer 125d and the sixth outer surface adhesive layer 124f. That is, the first inner coil side surface 51b is maintained as an adhesive region that is in a state in which the first inner coil side surface 51b is fixed to the first slot inner side surface 45 via the insulating sheet layer 122.

In addition, the first outer coil side surface 51a is maintained as an adhesive region fixed to the first slot inner side surface 45 via the insulating sheet layer 122.

Here, the first coil side surface 51 is constituted by the first outer coil side surface 51a and the first inner coil side surface 51b. Accordingly, the first coil side surface 51 is maintained as an adhesive region that is in a state in which the first coil side surface 51 is fixed to the first slot inner side surface 45 via the insulating sheet layer 122.

According to the stator 120 of the third embodiment, the first coil end surface 53 serving as a non-adhesive region is held in a state in which the first coil end surface 53 is not fixed to the first slot inner end surface 47. In addition, the second coil end surface 54 serving as a non-adhesive region is held in a state in which the second slot inner end surface 48 is not fixed to the second slot inner end surface 48.

Accordingly, it is possible to prevent the coils 13 from being adhered to the stator core 11 too strongly.

Accordingly, it is possible to suppress rigidity of the rotary electric machine 1 from excessively increasing, and NV characteristics can be appropriately secured.

Meanwhile, the first coil side surface 51 serving as an adhesive region is held in a state in which the first coil side surface 51 is fixed to the first slot inner side surface 45 via the insulating sheet layer 122. In addition, the second coil side surface 52 serving as an adhesive region is held in a state in which the second coil side surface 52 is fixed to the second slot inner side surface 46 via the insulating sheet layer 122.

Accordingly, heat generated by the coils 13 can be transferred from the first coil side surface 51 via the insulating sheet layer 122 to the stator core 11 via the first slot inner side surface 45. In addition, heat generated by the coils 13 can be transferred from the second coil side surface 52 via the insulating sheet layer 122 to the stator core 11 via the second slot inner side surface 46. Heat transfer characteristics from the coils 13 to the stator core 11 can be appropriately secured.

Here, for example, the back yoke 23 of the stator core 11 is maintained in a state in which it is cooled by the water cooling structure. Accordingly, heat of the coils 13 transmitted to the stator core is appropriately cooled by the water cooling structure, and cooling characteristics of the coils 13 are appropriately secured. Accordingly, a temperature of the coils 13 can be appropriately secured.

Next, a stator 130 of a first variant of a third embodiment will be described with reference to FIG. 11.

First Variant of Third Embodiment

Figure 11:
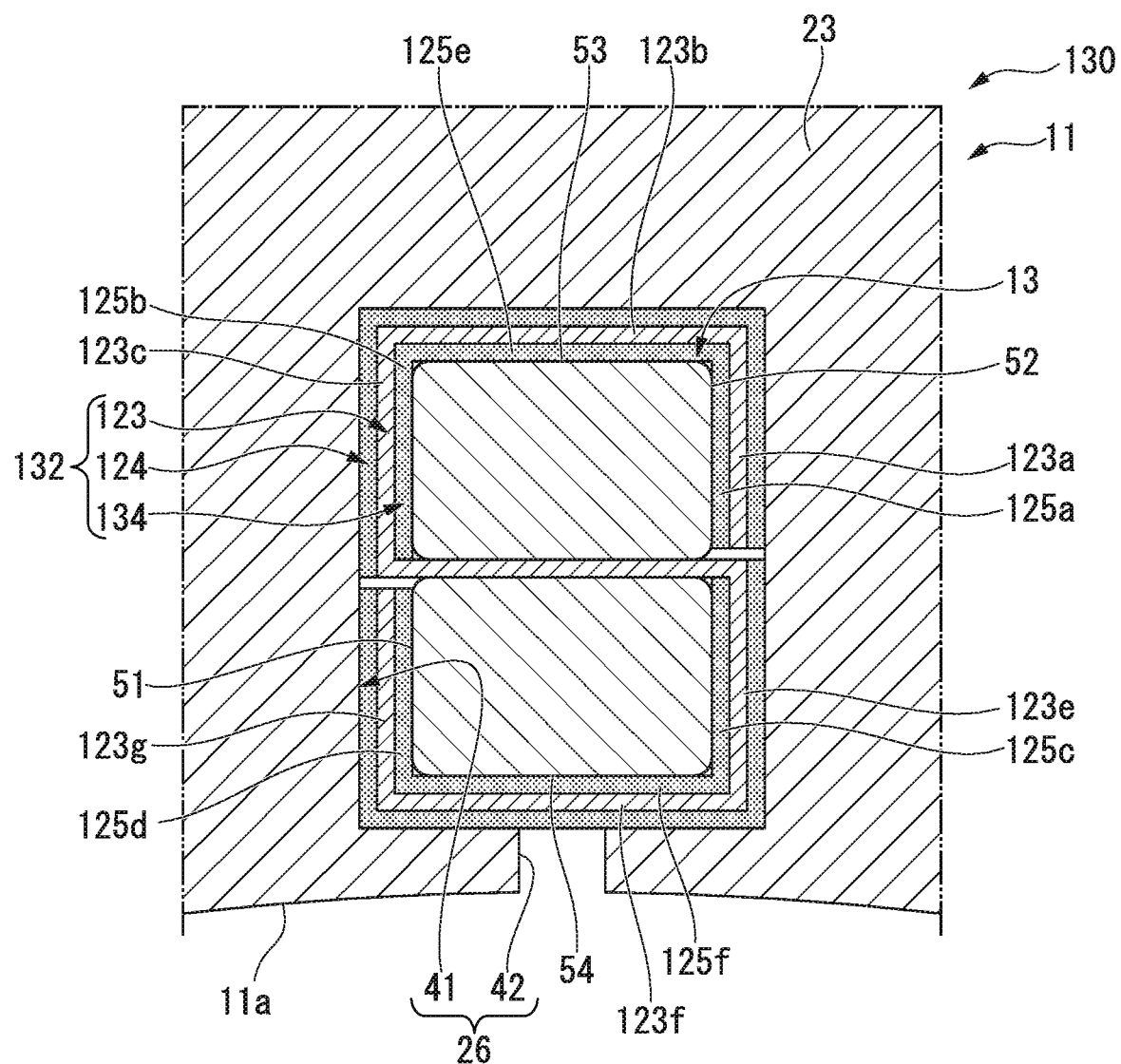
FIG. 11 is a cross-sectional view showing a stator of a rotary electric machine according to a first variant of the third embodiment of the present invention.

As shown in FIG. 11, in the stator 130, the insulating sheet layer 122 of a third embodiment is replaced with an insulating sheet layer 132, and the other configurations are similar to the stator 120 of the third embodiment.

The insulating sheet layer 132 includes, for example, an insulating sheet 123, an outer surface adhesive layer 124 and an inner surface adhesive layer 134. That is, in the insulating sheet layer 132, the inner surface adhesive layer 125 of the insulating sheet layer 122 of the third embodiment is replaced with the inner surface adhesive layer 134, and the other configurations are similar to the insulating sheet layer 122 of the third embodiment.

The inner surface adhesive layer 134 includes a fourth inner surface adhesive layer 125d and a fifth inner surface adhesive layer 125e, in addition to the inner surface adhesive layer 125 (see FIG. 10) of the third embodiment.

The fifth inner surface adhesive layer 125e is interposed between the first inner surface adhesive layer 125a and the second inner surface adhesive layer 125b, and formed to be continuous with the inner surface adhesive layers 125a and 125b. The fifth inner surface adhesive layer 125e is laminated on the entire inner surface of the second sheet section 123b while being overlapped on each other.

A sixth inner surface adhesive layer 125f is interposed between the third inner surface adhesive layer 125c and the fourth inner surface adhesive layer 125d and formed to be continuous with the inner surface adhesive layers 125c and 125d. The sixth inner surface adhesive layer 125f is laminated on the entire inner surface of the sixth sheet section 123f while being overlapped on each other.

That is, the first inner surface adhesive layer 125a, the second inner surface adhesive layer 125b and the fifth inner surface adhesive layer 125e are integrally formed in a layered shape continuous with all of the surfaces of the first to third sheet sections 123a to 123c. Accordingly, a lamination area of the first inner surface adhesive layer 125a, the second inner surface adhesive layer 125b and the fifth inner surface adhesive layer 125e is largely secured with respect to the first to third sheet sections 123a to 123c.

In addition, the third inner surface adhesive layer 125c, the fourth inner surface adhesive layer 125d and the sixth inner surface adhesive layer 125f are integrally formed in a layered shape continuous with all of the surfaces of the fifth to seventh sheet sections 123e to 123g. Accordingly, a lamination area of the third inner surface adhesive layer 125c, the fourth inner surface adhesive layer 125d and the sixth inner surface adhesive layer 125f is largely secured with respect to the fifth to seventh sheet sections 123e to 123g.

Here, when the insulating sheet layer 132 is disposed between the slots 26 and the coils 13, the first to sixth inner surface adhesive layers 125a to 125f come in contact with the first coil side surface 51, the second coil side surface 52, the first coil end surface 53 and the second coil end surface 54.

In this state, a lamination area of the first to sixth inner surface adhesive layers 125a to 125f is largely secured with respect to the first to third sheet sections 123a to 123c and the fifth to seventh sheet sections 123e to 123g (i.e., the inner surface adhesive layer 134). Accordingly, exfoliation of the first to sixth inner surface adhesive layers 125a to 125f from the inner surface adhesive layer 134 can be prevented. Accordingly, a work for disposing the insulating sheet layer 132 between the slots 26 and the coils 13 becomes easy, and productivity can be increased.

Next, a stator 140 of a second variant of the third embodiment will be described with reference to FIG. 12.

Second Variant of Third Embodiment

Figure 12:
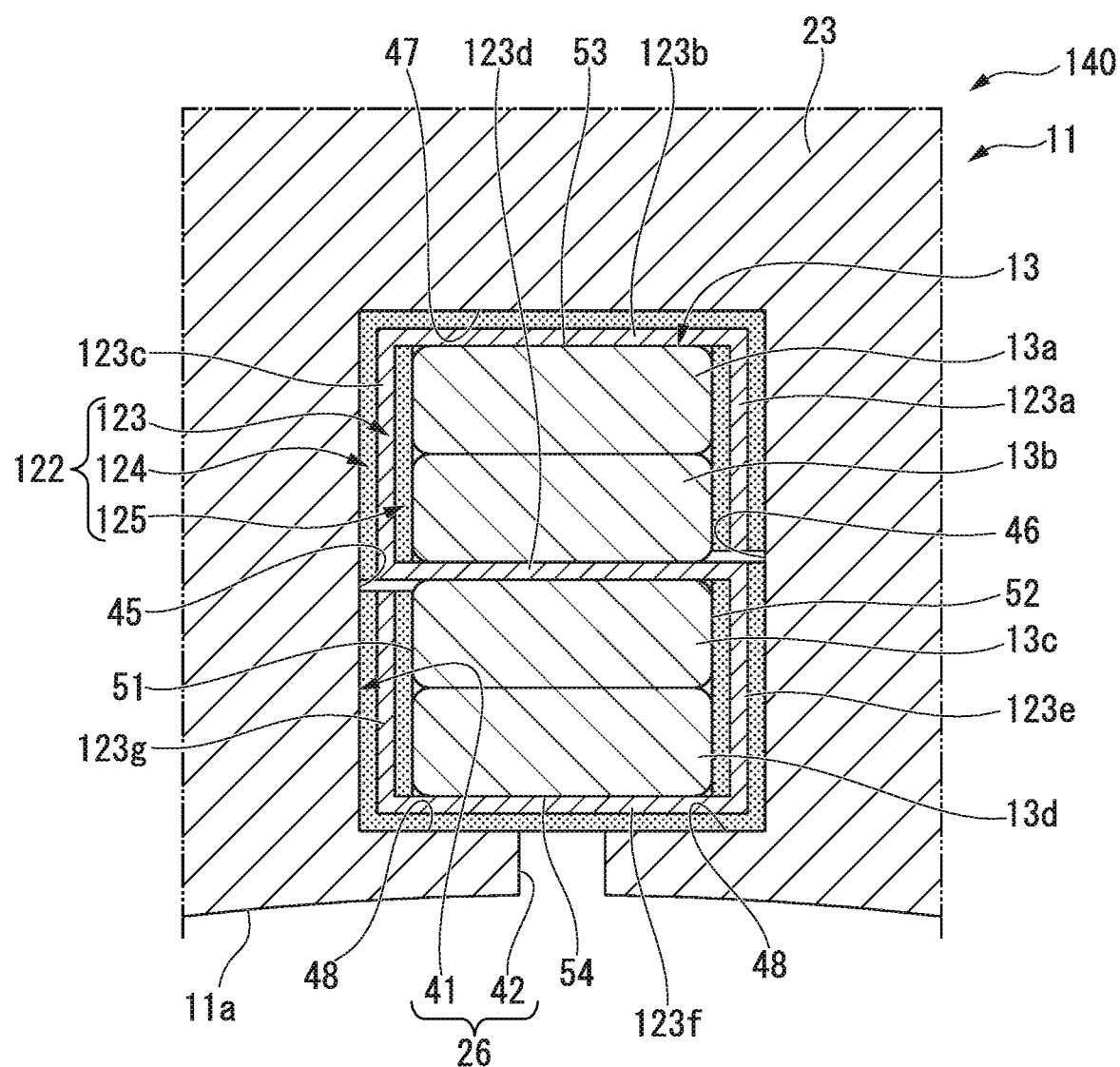
FIG. 12 is a cross-sectional view showing a stator of a rotary electric machine according to a second variant of the third embodiment of the present invention.

As shown in FIG. 12, in the stator 140, the number of the segment coils of the coils 13 is increased, and the other configurations are similar to the stator 120 of the third embodiment.

The coils 13 include a first segment coil 13a, a second segment coil 13b, a third segment coil 13c and a fourth segment coil 13d.

The first to fourth segment coils 13a to 13d are laminated from the back yoke 23 toward the slot opening section 42 (i.e., an air gap) in the radial direction.

The coils 13 are formed to a large size in comparison with the coils 13 of the third embodiment by being constituted by the four segment coils 13a to 13d.

In the stator 140 of the second variant, like the third embodiment, the insulating sheet layer 122 is formed between the slots 26 and the coils 13 in an S shape. In this state, the entire circumferential surfaces (i.e., the first to fourth coil side surfaces 51 to 54) of the coils 13 are covered with the insulating sheet layer 122. The fourth sheet section 123d is interposed between the second segment coil 13b and the third segment coil 13c while being sandwiched therebetween.

According to the stator 140 of the second variant, like the stator 120 of the third embodiment, the first coil end surface 53 serving as a non-adhesive region is held in a state in which the first coil end surface 53 is not fixed (adhered) to the first slot inner end surface 47. In addition, the second coil end surface 54 serving as a non-adhesive region is held in a state in which the second coil end surface 54 is not fixed (adhered) to the second slot inner end surface 48.

Accordingly, it is possible to prevent the coils 13 from being adhered to the stator core 11 too strongly.

Accordingly, it is possible to suppress rigidity of the rotary electric machine 1 from excessively increasing, and NV characteristics can be appropriately secured.

Meanwhile, the first coil side surface 51 serving as an adhesive region is held in a state in which the first coil side surface 51 is fixed (adhered) to the first slot inner side surface 45 via the insulating sheet layer 122. In addition, the second coil side surface 52 serving as an adhesive region is held in a state in which the second coil side surface 52 is fixed to the second slot inner side surface 46 via the insulating sheet layer 122.

Accordingly, heat generated by the coils 13 can be appropriately transferred from the first coil side surface 51 via the insulating sheet layer 122 to the stator core 11 via the first slot inner side surface 45. In addition, heat generated by the coils 13 can be appropriately transferred from the second coil side surface 52 via the insulating sheet layer 122 to the stator core 11 via the second slot inner side surface 46. Heat transfer characteristics from the coils 13 to the stator core 11 can be appropriately secured.

Here, for example, the back yoke 23 of the stator core 11 is maintained in a state in which it is cooled by the water cooling structure. Accordingly, heat of the coils 13 transferred to the stator core is appropriately cooled by the water cooling structure, and cooling characteristics of the coils 13 are appropriately secured. Accordingly, a temperature of the coils 13 can be appropriately secured.

Next, a stator 150 of a third variant of the third embodiment will be described with reference to FIG. 13.

Third Variant of Third Embodiment

Figure 13:
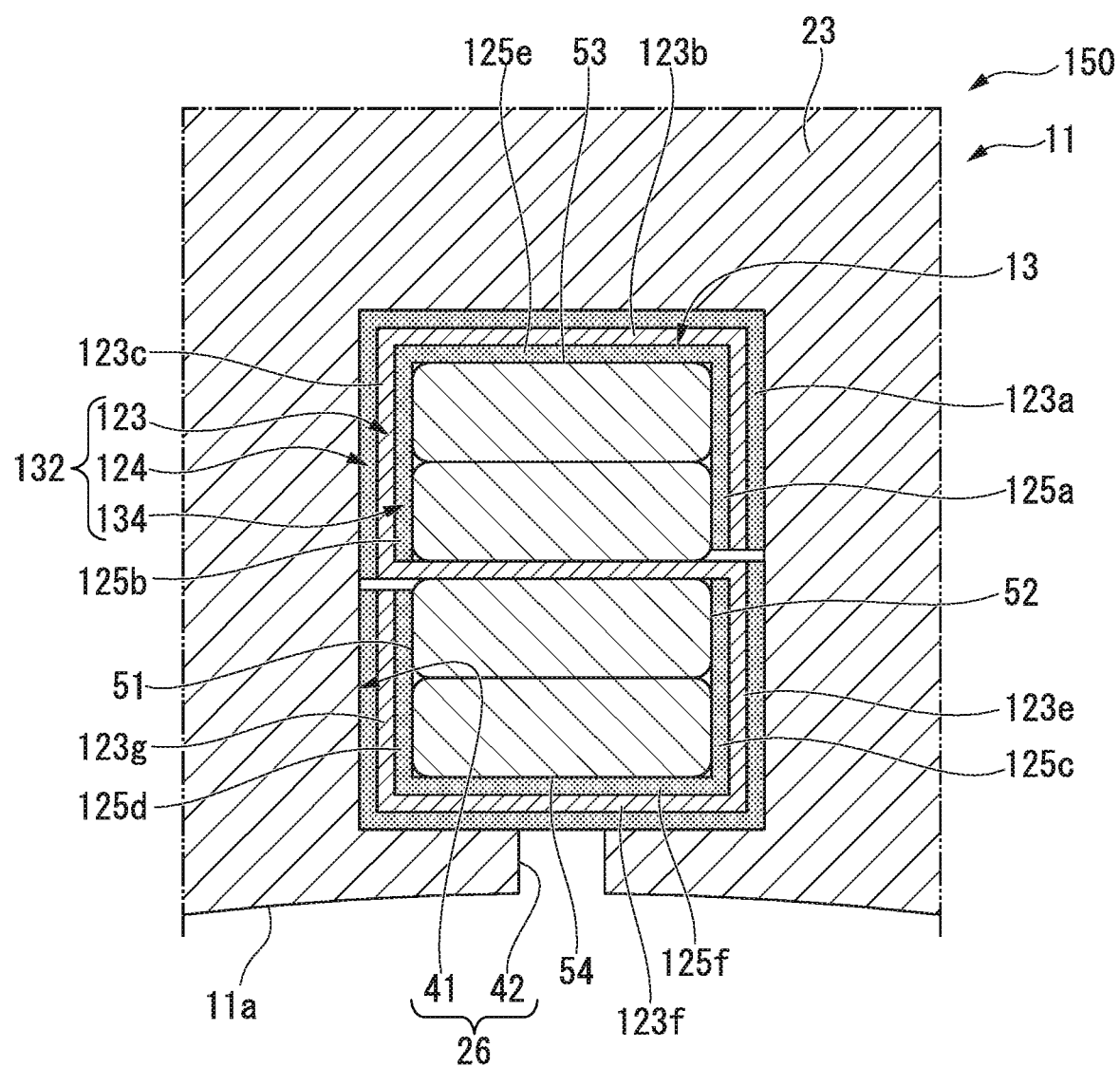
FIG. 13 is a cross-sectional view showing a stator of a rotary electric machine according to a third variant of the third embodiment of the present invention.

As shown in FIG. 13, in the stator 150, the insulating sheet layer 122 of the second variant of the third embodiment is replaced with the insulating sheet layer 132, and the other configurations are similar to the stator 140 of the second variant of the third embodiment.

The insulating sheet layer 132 includes, for example, an insulating sheet 123, an outer surface adhesive layer 124 and an inner surface adhesive layer 134. That is, in the insulating sheet layer 132, the inner surface adhesive layer 125 of the insulating sheet layer 122 of the second variant of the third embodiment is replaced with the inner surface adhesive layer 134, and the other configurations are similar to the insulating sheet layer 122 of the second variant of the third embodiment.

The inner surface adhesive layer 134 includes a fifth inner surface adhesive layer 125e and a sixth inner surface adhesive layer 125f, in addition to the inner surface adhesive layer 125 (see FIG. 12) of the second variant of the third embodiment.

The fifth inner surface adhesive layer 125e is interposed between the first inner surface adhesive layer 125a and the second inner surface adhesive layer 125b, and formed to be continuous with the inner surface adhesive layers 125a and 125b. The fifth inner surface adhesive layer 125e is laminated on the entire inner surface of the second sheet section 123b while being overlapped on each other.

The sixth inner surface adhesive layer 125f is interposed between the third inner surface adhesive layer 125c and the fourth inner surface adhesive layer 125d and formed to be continuous with the inner surface adhesive layers 125c and 125d. The sixth inner surface adhesive layer 125f is laminated on the entire inner surface of the sixth sheet section 123f while being overlapped on each other.

That is, the first inner surface adhesive layer 125a, the second inner surface adhesive layer 125b and the fifth inner surface adhesive layer 125e are integrally formed in a layered shape continuous with all of the surfaces of the first to third sheet sections 123a to 123c. Accordingly, a lamination area of the first inner surface adhesive layer 125a, the second inner surface adhesive layer 125b and the fifth inner surface adhesive layer 125e with respect to the first to third sheet sections 123a to 123c can be largely secured.

In addition, the third inner surface adhesive layer 125c, the fourth inner surface adhesive layer 125d and the sixth inner surface adhesive layer 125f are integrally formed in a layered shape continuous with all of the surfaces of the fifth to seventh sheet sections 123e to 123g. Accordingly, a lamination area of the third inner surface adhesive layer 125c, the fourth inner surface adhesive layer 125d and the sixth inner surface adhesive layer 125f with respect to the fifth to seventh sheet sections 123e to 123g can be largely secured.

Here, when the insulating sheet layer 132 is disposed between the slots 26 and the coils 13, the first to sixth inner surface adhesive layers 125a to 125f come in contact with the first coil side surface 51, the second coil side surface 52, the first coil end surface 53 and the second coil end surface 54.

In this state, a lamination area of the first to sixth inner surface adhesive layers 125a to 125f is largely secured with respect to the first to third sheet sections 123a to 123c and the fifth to seventh sheet sections 123e to 123g (i.e., the inner surface adhesive layer 134). Accordingly, exfoliation of the first to sixth inner surface adhesive layers 125a to 125f from the inner surface adhesive layer 134 can be prevented. Accordingly, a work for disposing the insulating sheet layer 132 between the slots 26 and the coils 13 becomes easy, and productivity can be increased.

Next, a stator 160 of a fourth embodiment will be described with reference to FIG. 14.

Fourth Embodiment

Figure 14:
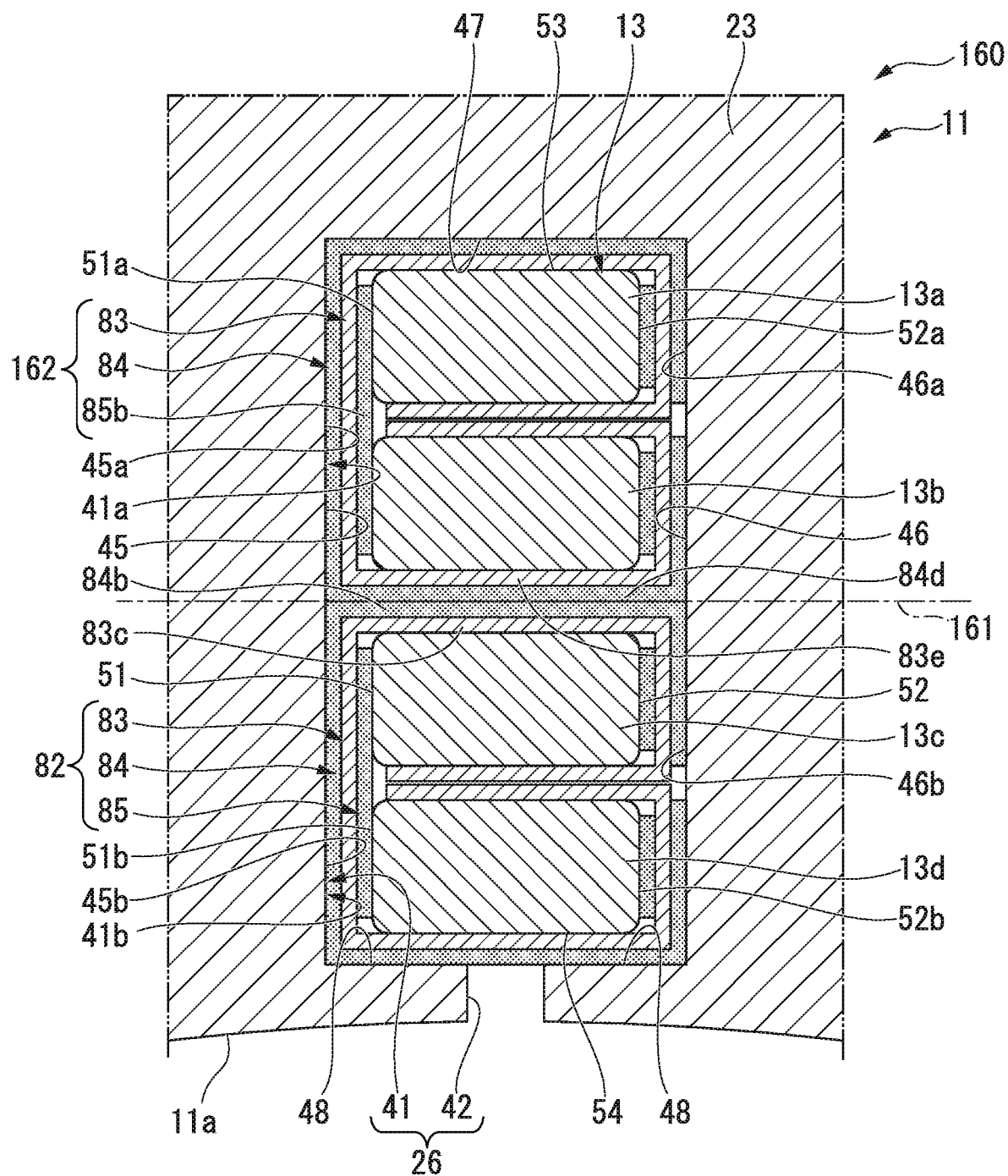
FIG. 14 is a cross-sectional view showing a stator of a rotary electric machine according to a fourth embodiment of the present invention.

As shown in FIG. 14, in the stator 160, the slot inner circumferential surface 41 is constituted by a slot outside inner circumferential surface 41a and a slot inside inner circumferential surface 41b.

Here, in the rotary electric machine 1 (see FIG. 2), it is conceivable that a coil eddy current loss of the slot inside inner circumferential surface 41b (an air gap side) of the rotary electric machine 1 is increased in a high-revolution and high-torque zone, and generation of heat by the coils 13 may be increased. Here, in the stator 160 of the fourth embodiment, heat transfer characteristics of the slot inside inner circumferential surface 41b are larger than those of the slot outside inner circumferential surface 41a.

The slot outside inner circumferential surface 41a is an area of the slot inner circumferential surface 41 close to an outer side of the slots 26 in the radial direction. In other words, the slot outside inner circumferential surface 41a is a surface of the slot inner circumferential surface 41 in the radial direction close to an outer side in the radial direction extending outward from a center 161 of the slot inner circumferential surface 41 to the back yoke 23 in the radial direction.

The slot outside inner circumferential surface 41a includes a first outer slot inner side surface 45a of the first slot inner side surface 45 and a second outer slot inner side surface 46a of the second slot inner side surface 46.

The slot inside inner circumferential surface 41b is an area of the slot inner circumferential surface 41 close to an inner side of the slots 26 in the radial direction. In other words, the slot inside inner circumferential surface 41b is a surface of the slot inner circumferential surface 41 in the radial direction close to an inner side in the radial direction extending inward from the center 161 of the slot inner circumferential surface 41 to the slot opening section 42 (i.e., an air gap side) in the radial direction.

The slot inside inner circumferential surface 41b includes a first inner slot inner side surface 45b of the first slot inner side surface 45 and a second inner slot inner side surface 46b of the second slot inner side surface 46.

The stator 160 includes the coils 13, an insulating sheet layer 162 close to an outer side, and the insulating sheet layer 82 close to an inner side.

The coils 13 include, for example, the first to fourth segment coils 13a to 13d.

The first to fourth segment coils 13a to 13d are laminated from the inner circumferential surface 11a of the stator core 11 toward the outer circumferential surface 11b (see FIG. 2) in the radial direction of the stator core 11.

The first segment coil 13a and the second segment coil 13b are disposed on the slot outside inner circumferential surface 41a. By the first segment coil 13a and the second segment coil 13b, the first outer coil side surface 51a of the first coil side surface 51 is formed, and the second outer coil side surface 52a of the second coil side surface 52 is formed.

The third segment coil 13c and the fourth segment coil 13d are disposed on the slot inside inner circumferential surface 41b. By the third segment coil 13c and the fourth segment coil 13d, the first inner coil side surface 51b of the first coil side surface 51 is formed, and the second inner coil side surface 52b of the second coil side surface 52 is formed.

The insulating sheet layer 162 close to an outer side is disposed on the slot outside inner circumferential surface 41a to cover the first and second segment coils 13a and 13b. The insulating sheet layer 162 on the outer side includes, for example, the insulating sheet 83, the outer surface adhesive layer 84 and the second inner surface adhesive layer 85b.

The insulating sheet layer 82 close to an inner side is disposed on the slot inside inner circumferential surface 41b to cover the third and fourth segment coils 13c and 13d. The insulating sheet layer 82 on the inner side includes, for example, the insulating sheet 83, the outer surface adhesive layer 84 and the inner surface adhesive layer 85.

Since the insulating sheet layer 82 on the inner side is disposed on the slot inside inner circumferential surface 41b, the first inner coil side surface 51b is an adhesive region fixed (adhered) to the first inner slot inner side surface 45b via the insulating sheet layer 82 on the inner side. In addition, the second inner coil side surface 52b is an adhesive region fixed (adhered) to the second inner slot inner side surface 46b via the insulating sheet layer 82 on the inner side.

That is, in the third and fourth segment coils 13c and 13d, both side surfaces of the first inner coil side surface 51b and the second inner coil side surface 52b become adhesive regions fixed to the stator core 11.

Accordingly, heat generated by the third and fourth segment coils 13c and 13d can be appropriately transferred from the first inner coil side surface 51b to the stator core 11 via the insulating sheet layer 82 and the first inner slot inner side surface 45b.

In addition, heat generated by the third and fourth segment coils 13c and 13d can be appropriately transferred from the second inner coil side surface 52b to the stator core 11 via the insulating sheet layer 82 and the second inner slot inner side surface 46b.

Accordingly, in the slot inside inner circumferential surface 41b, heat transfer characteristics of transferring heat generated by the third and fourth segment coils 13c and 13d to the stator core 11 can be appropriately secured.

In addition, since the insulating sheet layer 162 is disposed on the slot outside inner circumferential surface 41a, the first outer coil side surface 51a is an adhesive region fixed (adhered) to the first outer slot inner side surface 45a via the insulating sheet layer 162 on the outer side.

Meanwhile, the second outer coil side surface 52a is maintained as a non-adhesive region that is in non-contact with the second outer slot inner side surface 46a.

That is, in the first and second segment coils 13a and 13b, the second outer coil side surface 52a is a non-adhesive region as one side surface of the first outer coil side surface 51a and the second outer coil side surface 52a. Accordingly, in the slot outside inner circumferential surface 41a, heat transfer characteristics of transferring heat generated by the first and second segment coils 13a and 13b to the stator core 11 can be appropriately minimized.

Here, it is conceivable that the rotary electric machine 1 (see FIG. 2) has a coil eddy current loss of the slot inside inner circumferential surface 41b of the rotary electric machine 1, which is large in the high-revolution and high-torque zone, and generation of heat by the third and fourth segment coils 13c and 13d is increased. Here, heat transfer characteristics were improved on the side of the slot inside inner circumferential surface 41b at which generation of heat by the third and fourth segment coils 13c and 13d is increased.

Meanwhile, generation of heat by the first and second segment coils 13a and 13b is appropriately suppressed.

Here, heat transfer characteristics on the side of the slot outside inner circumferential surface 41a on which the first and second segment coils 13a and 13b are disposed are appropriately suppressed.

Accordingly, temperatures of the first to fourth segment coils 13a to 13d (i.e., the coils 13) can be uniformized. Accordingly, heat generated by the coils 13 can be efficiently transferred to the stator core 11, and the coils 13 can be effectively cooled.

Next, a stator 170 of a fifth embodiment will be described with reference to FIG. 15.

Fifth Embodiment

Figure 15:
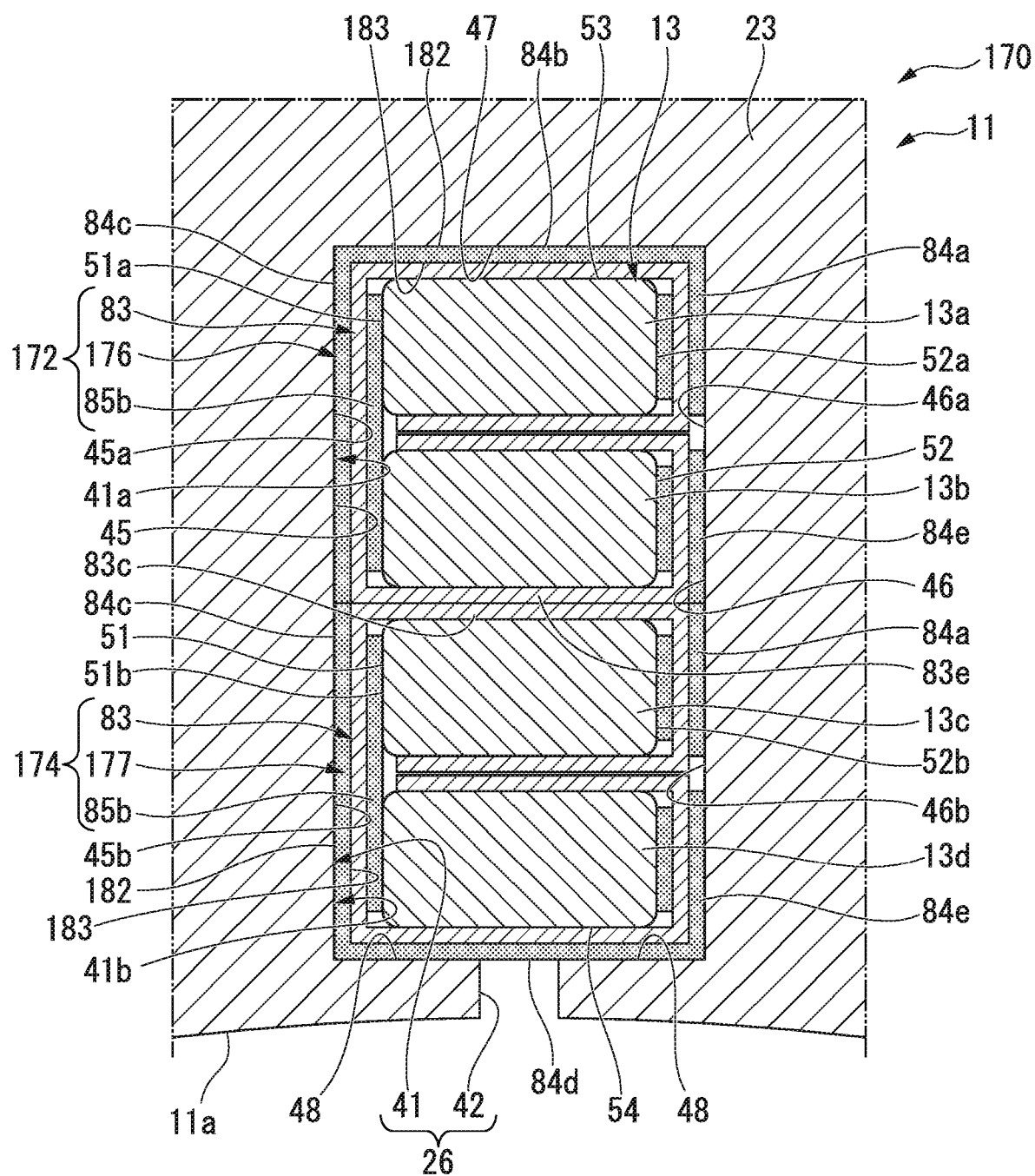
FIG. 15 is a cross-sectional view showing a stator of a rotary electric machine according to a fifth embodiment of the present invention.

As shown in FIG. 15, in the stator 170, the insulating sheet layer 162 on the outer side of the fourth embodiment is replaced with an insulating sheet layer 172 close to an outer side and the insulating sheet layer 162 on the inner side is replaced with an insulating sheet layer 174 close to an inner side, and the other configurations are similar to the fourth embodiment.

The insulating sheet layer 172 on the outer side is disposed on the slot outside inner circumferential surface 41a to cover the first segment coil 13a and the second segment coil 13b. The insulating sheet layer 172 on the outer side includes, for example, an insulating sheet 83, an outer surface adhesive layer 176 and a second inner surface adhesive layer 85b.

The outer surface adhesive layer 176 on the outer side is obtained by removing the fourth outer surface adhesive layer 84d (see FIG. 14) from the outer surface adhesive layer 84 of the fourth embodiment.

The insulating sheet 83 on the outer side includes a sheet outer side surface 182 and a sheet inner side surface 183. The sheet outer side surface 182 on the outer side is formed in a U shape to face the slot outside inner circumferential surface 41a, and a side thereof close to the slot opening section 42 is open. The first outer surface adhesive layer 84a, the second outer surface adhesive layer 84b, the third outer surface adhesive layer 84c and the fifth outer surface adhesive layer 84e are laminated on the entire region of the sheet outer side surface 182 on the outer side. The sheet outer side surface 182 on the outer side is an adhesive region that is fixed (adhered) entirely to the slot outside inner circumferential surface 41a via the outer surface adhesive layers 84a, 84b, 84c and 84e.

The sheet inner side surface 183 on the outer side is formed in a U shape to face the first segment coil 13a and the second segment coil 13b, and a side thereof close to the slot opening section 42 is open. A second outer surface adhesive layer 85b is laminated on a surface of the sheet inner side surface 183 on the outer side facing the first outer coil side surface 51a (a part of the sheet inner side surface 183). The surface of the sheet inner side surface 183 on the outer side facing the first outer coil side surface 51a is an adhesive region fixed (adhered) to the first outer coil side surface 51a via the second outer surface adhesive layer 85b.

Accordingly, since the insulating sheet layer 172 on the outer side is disposed on the slot outside inner circumferential surface 41a, the first outer coil side surface 51a is fixed (adhered) to the first outer slot inner side surface 45a via the insulating sheet layer 172 on the outer side.

In addition, an outer surface adhesive layer is not laminated on a surface of the sheet inner side surface 183 on the outer side facing the second outer coil side surface 52a. A surface of the sheet inner side surface 183 on the outer side facing the second outer coil side surface 52a is maintained as a non-adhesive region with respect to the second outer coil side surface 52a in a non-adhesion state.

Accordingly, the second outer coil side surface 52a is maintained in non-contact with the second outer slot inner side surface 46a.

The insulating sheet layer 174 on the inner side is disposed on the slot inside inner circumferential surface 41b to cover the third segment coil 13c and the fourth segment coil 13d. The insulating sheet layer 174 on the inner side includes, for example, an insulating sheet 83, an outer surface adhesive layer 177 and an inner surface adhesive layer 85b.

The outer surface adhesive layer 177 on the inner side is obtained by removing the second outer surface adhesive layer 84b (see FIG. 14) from the outer surface adhesive layer 84 of the fourth embodiment.

The insulating sheet 83 on the inner side includes the sheet outer side surface 182 and the sheet inner side surface 183.

The sheet outer side surface 182 on the inner side is formed in a U shape to face the slot outside inner circumferential surface 41a, and a side thereof close to the back yoke 23 is open. The first outer surface adhesive layer 84a, the third outer surface adhesive layer 84c, the fourth outer surface adhesive layer 84d and the fifth outer surface adhesive layer 84e are laminated on the entire region of the sheet outer side surface 182 on the inner side. The sheet outer side surface 182 on the inner side is an adhesive region fixed (adhered) entirely to the slot inside inner circumferential surface 41b via the outer surface adhesive layers 84a, 84c, 84d and 84e.

The sheet inner side surface 183 on the inner side is formed in a U shape to face the third segment coil 13c and the fourth segment coil 13d, and a side thereof close to the back yoke 23 is open. The second outer surface adhesive layer 85b is laminated on a surface of the sheet inner side surface 183 on the inner side facing the first inner coil side surface 51b (a part of the sheet inner side surface 183). The surface of the sheet inner side surface 183 on the inner side facing the first inner coil side surface 51b is an adhesive region fixed (adhered) to the first inner coil side surface 51b via the second outer surface adhesive layer 85b.

Accordingly, since the insulating sheet layer 174 on the inner side is disposed on the slot inside inner circumferential surface 41b, the first inner coil side surface 51b is fixed (adhered) to the first inner slot inner side surface 45b via the insulating sheet layer 174 on the inner side.

In addition, an outer surface adhesive layer is not laminated on the surface of the sheet inner side surface 183 on the inner side facing the second inner coil side surface 52b. The surface of the sheet inner side surface 183 on the inner side facing the second inner coil side surface 52b is maintained as a non-adhesive region with respect to the second inner coil side surface 52b in a non-adhesion state.

Accordingly, the second inner coil side surface 52b is maintained in a non-contact manner with respect to the second inner slot inner side surface 46b.

Here, for example, when the rotary electric machine 1 (see FIG. 2) includes a sufficient cooling capacity, heat transfer characteristics from the first to fourth segment coils 13a to 13d to the stator core 11 can be suppressed to a relatively low level.

Here, the surface of the sheet inner side surface 183 on the outer side facing the second outer coil side surface 52a is made as a non adhesive region and is maintained in a non-adhesion state with respect to the second outer coil side surface 52a. In addition, the surface of the sheet inner side surface 183 on the inner side facing the second inner coil side surface 52b is made as a non adhesive region and is maintained in a non-adhesion state with respect to the second inner coil side surface 52b.

The second coil side surface 52 is constituted by the second outer coil side surface 52a and the second inner coil side surface 52b. Accordingly, in the first to fourth segment coils 13a to 13d, the second coil side surface 52 can be maintained in a non-contact manner with respect to the second slot inner side surface 46.

Accordingly, it is possible to prevent the first to fourth segment coils 13a to 13d from being adhered to the stator core 11 too tightly. As a result, it is possible to suppress rigidity of the rotary electric machine 1 (see FIG. 1) from excessively increasing, and NV characteristics can be more appropriately secured.

Incidentally, in the outer surface adhesive layer 176 of the insulating sheet layer 172 on the outer side, the fourth outer surface adhesive layer 84d (see FIG. 14) is removed from the outer surface adhesive layer 84 of the fourth embodiment.

In the outer surface adhesive layer 177 of the insulating sheet layer 174 on the inner side, the second outer surface adhesive layer 84b (see FIG. 14) is removed from the outer surface adhesive layer 84 of the fourth embodiment.

That is, as shown in FIG. 14, the fourth outer surface adhesive layer 84d and the second outer surface adhesive layer 84b are disposed between the second segment coil 13b and the third segment coil 13c while being sandwiched therebetween. That is, the fourth outer surface adhesive layer 84d and the second outer surface adhesive layer 84b are adhesive layers that do not contact with the slot inner circumferential surfaces 41 of the slots 26. Accordingly, the fourth outer surface adhesive layer 84d and the second outer surface adhesive layer 84b can be removed.

Here, as shown in FIG. 15, the fourth outer surface adhesive layer 84d (see FIG. 14) of the fourth embodiment is removed from the outer surface adhesive layer 176, and the second outer surface adhesive layer 84b (see FIG. 14) of the fourth embodiment is removed from the outer surface adhesive layer 177. Accordingly, the fifth sheet section 83e and the third sheet section 83c are maintained in a non-adhesion state. Accordingly, it is possible to suppress rigidity of the rotary electric machine 1 (see FIG. 1) from excessively increasing, and NV characteristics can be more appropriately secured.

Sixth Embodiment

Figure 16:
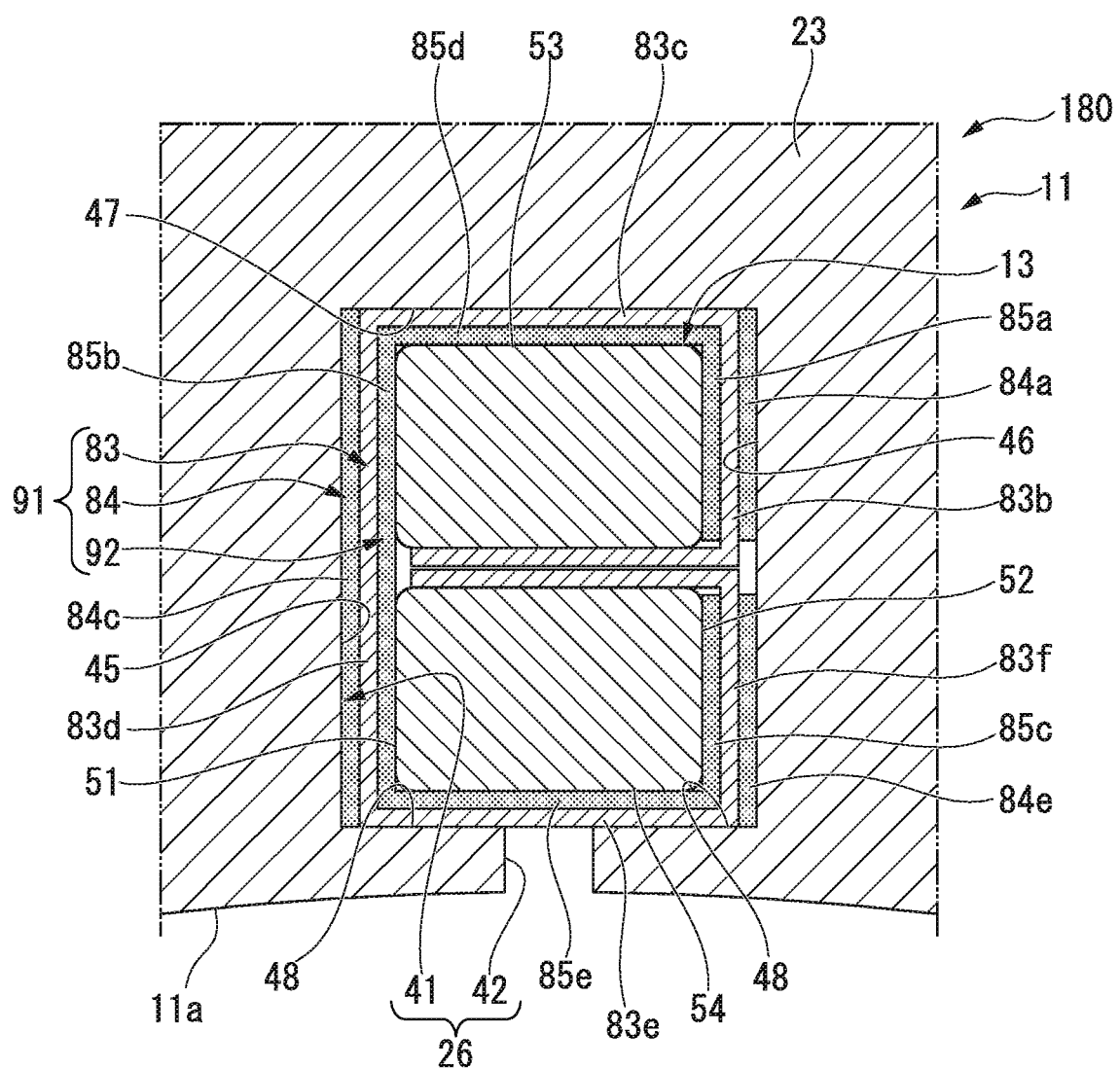
FIG. 16 is a cross-sectional view showing a stator of a rotary electric machine according to a sixth embodiment of the present invention.

As shown in FIG. 16, in a stator 180, the second outer surface adhesive layer 84*b* (see FIG. 6) and the fourth outer surface adhesive layer 84*d* (see FIG. 6) are removed from the outer surface adhesive layer 84 of the first variant of the second embodiment, the other configurations are similar to the stator 90 of the first variant.

According to the stator 180 of the sixth embodiment, the first coil end surface 53 serving as a non-adhesive region is maintained in a state in which the first coil end surface 53 is not fixed (adhered) to the first slot inner end surface 47. In addition, the second coil end surface 54 serving as a non-adhesive region is held in a state in which the second coil end surface 54 is not fixed (adhered) to the second slot inner end surface 48.

Accordingly, it is possible to prevent the coils 13 from being adhered to the stator core 11 too strongly.

Accordingly, it is possible to suppress rigidity of the rotary electric machine 1 from excessively increasing, and NV characteristics can be appropriately secured.

Meanwhile, the first coil side surface 51 serving as an adhesive region is held in a state in which the first coil side surface 51 is fixed (adhered) to the first slot inner side surface 45 via the insulating sheet layer 91. In addition, the second coil side surface 52 serving as an adhesive region is held in a state in which the second coil side surface 52 is fixed (adhered) to the second slot inner side surface 46 via the insulating sheet layer 91.

Accordingly, heat generated by the coils 13 can be transferred from the first coil side surface 51 via the insulating sheet layer 91 to the stator core 11 via the first slot inner side surface 45. In addition, heat generated by the coils 13 can be appropriately transferred from the second coil side surface 52 via the insulating sheet layer 91 to the stator core 11 via the second slot inner side surface 46. Heat transfer characteristics from the coils 13 to the stator core 11 can be appropriately secured.

Here, for example, the back yoke 23 of the stator core 11 is maintained in a state in which it is cooled by the water cooling structure. Accordingly, heat of the coils 13 transferred to the stator core is appropriately cooled by the water cooling structure, and cooling characteristics of the coils 13 are appropriately secured. Accordingly, a temperature of the coils 13 can be appropriately secured.

Seventh Embodiment

Figure 17:
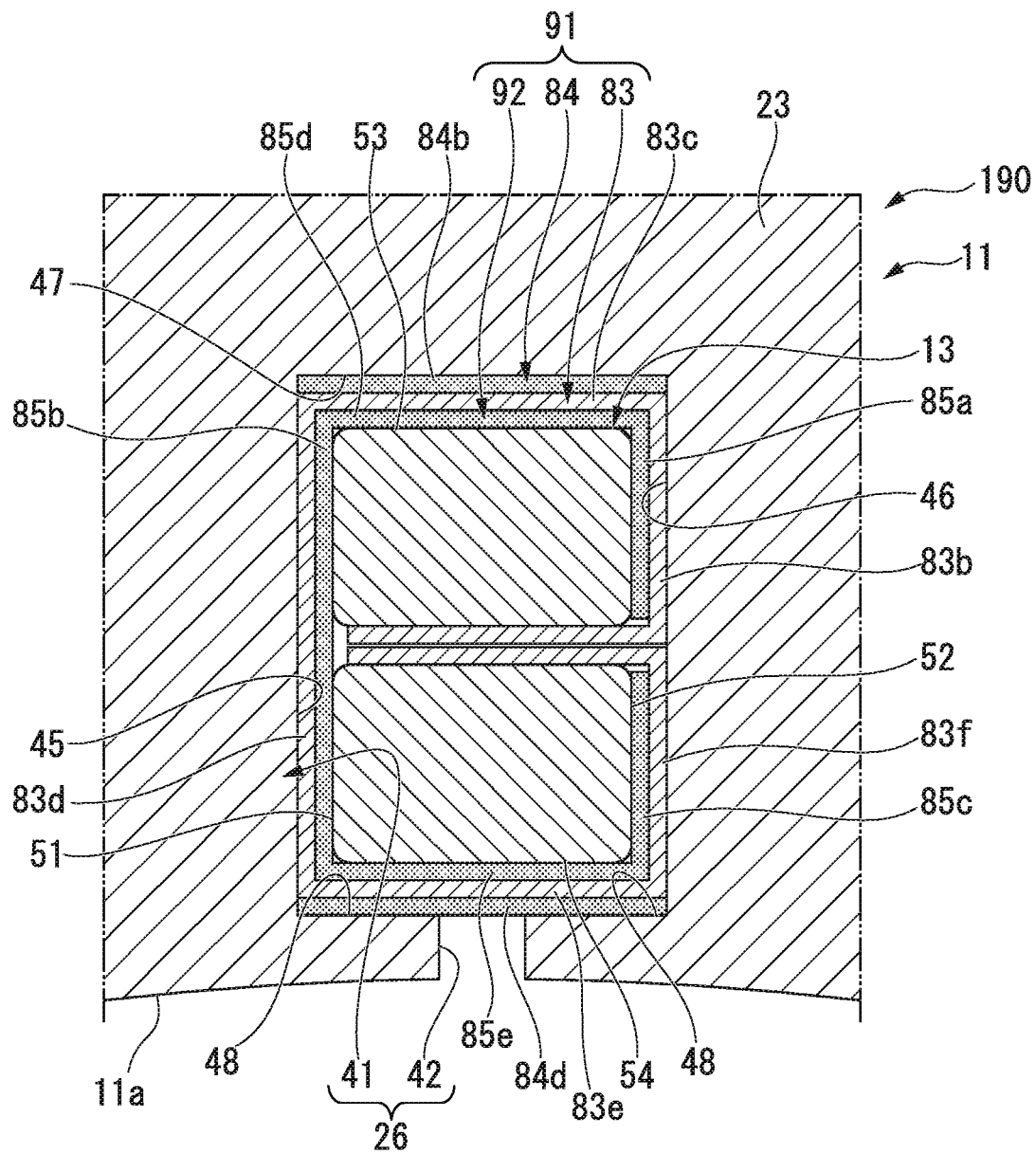
FIG. 17 is a cross-sectional view showing a stator of a rotary electric machine according to a seventh embodiment of the present invention.

As shown in FIG. 17, in a stator 190, the first outer surface adhesive layer 84*a*, the third outer surface adhesive layer 84*c* and the fifth outer surface adhesive layer 84*e* are removed from the outer surface adhesive layer 84 of the first variant of the second embodiment, and the other configurations are similar to the stator 90 of the first variant.

According to the stator 190 of the seventh embodiment, the first coil side surface 51 serving as a non-adhesive region is held in a state in which the first coil side surface 51 is not fixed (adhered) to the first slot inner side surface 45. In addition, the second coil side surface 52 serving as a non-adhesive region is held in a state in which the second coil side surface 52 is not fixed (adhered) to the second slot inner side surface 46.

Accordingly, it is possible to prevent the coils 13 from being adhered to the stator core 11 too strongly.

Accordingly, it is possible to suppress rigidity of the rotary electric machine 1 from excessively increasing, and NV characteristics can be appropriately secured.

Meanwhile, the first coil end surface 53 serving as an adhesive region is held in a state in which the first coil end surface 53 is fixed (adhered) to the first slot inner end surface 47 via the insulating sheet layer 91. In addition, the second coil end surface 54 serving as an adhesive region is held in a state in which the second coil end surface 54 is fixed (adhered) to the second slot inner end surface 48 via the insulating sheet layer 91.

Accordingly, heat generated by the coils 13 can be appropriately transferred from the first coil end surface 53 via the insulating sheet layer 91 to the stator core 11 via the first slot inner end surface 47. In addition, heat generated by the coils 13 can be appropriately transferred from the second coil end surface 54 via the insulating sheet layer 91 to the stator core 11 via the second slot inner end surface 48. Heat transfer characteristics from the coils 13 to the stator core 11 can be appropriately secured.

Here, for example, the back yoke 23 of the stator core 11 is held while being cooled by the water cooling structure. Accordingly, heat of the coils 13 transferred to the stator core is appropriately cooled by the water cooling structure, and cooling characteristics of the coils 13 are appropriately secured. Accordingly, a temperature of the coils 13 can be appropriately secured.

Further, the technical scope of the present invention is not limited to the above-mentioned embodiments and various modifications may be made without departing from the spirit of the present invention.

For example, while the insulating paper has been exemplified as the insulating sheet 56, 83 or 123 in the first embodiment to the fifth embodiment, there is no limitation thereto. As another example, for example, a resin sheet may be used as the insulating sheet 56, 83 or 123.

In addition, while the example in which the foamed resin sheet is used as the outer surface adhesive layer or the inner surface adhesive layer of the insulating sheet layer 15, 72, 74, 82, 91, 122, 132, 162, 172 or 174 has been described in the first embodiment to the fifth embodiment, there is no limitation thereto. As another example, for example, an adhesive agent or the like may be used as the outer surface adhesive layer or the inner surface adhesive layer.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A rotary electric machine comprising:
    a stator having a stator core with a plurality of slots, into which a coil and an insulating sheet layer are inserted,
    wherein the insulating sheet layer includes: an insulating sheet disposed so as to surround the coil, an inner surface adhesive layer which is formed by an adhesive material for adhering the insulating sheet layer with the coil and which is formed on at least a part of the insulating sheet layer on a side closer to the coil, and an outer surface adhesive layer which is formed by an adhesive material for adhering the insulating sheet layer with the inner surface of the slots, at least one side surface of the coil, which is inserted into the slots, extending along a radial direction of the stator core and an inner surface of the slots are adhered with each other via the outer surface adhesive layer, the insulating sheet, and the inner surface adhesive layer, at least one end surface of the coil, which is inserted into the slots, perpendicular to the radial direction of the stator core is in contact with the insulating sheet, and the insulating sheet and the outer surface adhesive layer are provided between the one end surface of the coil and the inner surface of the slots.

2. The rotary electric machine according to claim 1, wherein both side surfaces of the coil extending along the radial direction of the stator core are adhered to the inner surface of the slots via the outer surface adhesive layer, the insulating sheet and the inner surface adhesive layer.

3. The rotary electric machine according to claim 1, wherein at least one end surface of the coil perpendicular to the radial direction of the stator core faces the inner surface of the slots while being in contact with the insulating sheet.

4. The rotary electric machine according to claim 1, the insulating sheet includes a sheet section interposed between a pair of coils, and the pair of coils face each other while being in contact with the sheet section.

\* \* \* \* \*